(12) United States Patent
Alsop et al.

(10) Patent No.: US 11,242,110 B2
(45) Date of Patent: Feb. 8, 2022

(54) BICYCLE FRAME WITH INLINE SHOCK ASSEMBLY

(71) Applicant: Trek Bicycle Corporation, Waterloo, WI (US)

(72) Inventors: Edward A. Alsop, Madison, WI (US); Benjamin Blaise Fullerton, Jr., Madison, WI (US); Brian Gerhard Bentler, Cottage Grove, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 451 days.

(21) Appl. No.: 16/225,532

(22) Filed: Dec. 19, 2018

(65) Prior Publication Data
US 2019/0193804 A1    Jun. 27, 2019

Related U.S. Application Data

(60) Provisional application No. 62/609,193, filed on Dec. 21, 2017.

(51) Int. Cl.
| | | |
|---|---|---|
| *B62K 19/06* | (2006.01) | |
| *B62K 19/30* | (2006.01) | |
| *B62K 25/28* | (2006.01) | |
| *B62K 3/02* | (2006.01) | |

(52) U.S. Cl.
CPC ............... *B62K 19/06* (2013.01); *B62K 3/02* (2013.01); *B62K 19/30* (2013.01); *B62K 25/28* (2013.01)

(58) Field of Classification Search
CPC ...... B62K 25/08; B62K 25/28; B62K 25/286; B62K 19/06; B62K 19/30

USPC ............................................... 180/281.1, 284
See application file for complete search history.

(56) References Cited

U.S. PATENT DOCUMENTS

| | | | |
|---|---|---|---|
| 1,068,583 A | | 7/1913 | Harley |
| 3,877,539 A | * | 4/1975 | Tilkens ................... B62M 7/00 180/227 |
| 4,679,811 A | * | 7/1987 | Shuler .................... B62K 25/30 180/227 |
| 5,269,552 A | | 12/1993 | Yelverton |
| (Continued) | | | |

FOREIGN PATENT DOCUMENTS

| | | |
|---|---|---|
| CN | 205971686 | 2/2017 |
| DE | 20 2007 012 110 U1 | 2/2009 |
| (Continued) | | |

OTHER PUBLICATIONS

Extended European Search Report issued on EP 18214765.2, dated May 23, 2019.

*Primary Examiner* — Anne Marie M Boehler
(74) *Attorney, Agent, or Firm* — Bell & Manning, LLC; Christopher Kalafut

(57) ABSTRACT

A bicycle frame includes a front triangle that has a top tube, a down tube, and a seat tube. A bottom side of the top tube includes a cavity. The bicycle frame also includes a seat stay assembly that has a first seat stay, a second seat stay, and a seat stay yoke that connects the first seat stay and the second seat stay. The seat stay yoke is configured to at least partially fit within the cavity on the bottom side of the top tube. The bicycle frame further includes an inline shock assembly that has a stanchion and a shock. At least a portion of the stanchion is configured to fit within the seat stay yoke.

20 Claims, 29 Drawing Sheets

(56) References Cited

U.S. PATENT DOCUMENTS

| | | | |
|---|---|---|---|
| 5,409,248 A * | 4/1995 | Williams | B62K 25/30 |
| | | | 188/285 |
| 5,772,228 A | 6/1998 | Owyang | |
| 6,712,374 B2 | 3/2004 | Assier | |
| 7,140,628 B2 * | 11/2006 | Parkin | B62K 19/16 |
| | | | 280/281.1 |
| 7,467,803 B2 | 12/2008 | Buckley | |
| 7,665,568 B2 * | 2/2010 | Doperalski | B62K 25/283 |
| | | | 180/358 |
| 7,963,541 B2 | 6/2011 | Chamberlain | |
| 8,066,297 B2 | 11/2011 | Beale et al. | |
| 8,272,658 B2 | 9/2012 | Hoogendoorn | |
| 8,696,008 B2 | 4/2014 | Hoogendoorn | |
| 8,857,842 B2 | 10/2014 | Antonot | |
| 9,102,378 B2 | 8/2015 | Zawistowski | |
| 9,302,732 B2 | 4/2016 | Beale | |
| 9,469,369 B2 | 10/2016 | Thoma | |
| 9,493,247 B2 | 11/2016 | Reye et al. | |
| 9,527,545 B2 | 12/2016 | Juarez et al. | |
| 9,701,361 B2 | 7/2017 | Lumpkin | |
| 9,821,879 B2 | 11/2017 | Hoogendoorn et al. | |
| 2010/0027554 A1 | 12/2010 | Talavasek | |
| 2011/0291382 A1 | 12/2011 | Plantet | |
| 2016/0257371 A1 | 9/2016 | Droux | |
| 2016/0311493 A1 | 10/2016 | Scheffer | |
| 2017/0120983 A1 | 5/2017 | Atsushi | |
| 2019/0092116 A1 * | 3/2019 | Magnus | G01B 7/044 |

FOREIGN PATENT DOCUMENTS

| | | | |
|---|---|---|---|
| DE | 10 2008 008 186 B4 | 3/2012 | |
| EP | 1312543 | 1/2007 | |
| EP | 1425210 | 5/2011 | |
| EP | 2698310 | 5/2018 | |
| EP | 3708476 A1 * | 9/2020 | B62K 25/30 |
| FR | 3012407 | 5/2015 | |
| FR | 3052433 | 12/2017 | |

* cited by examiner

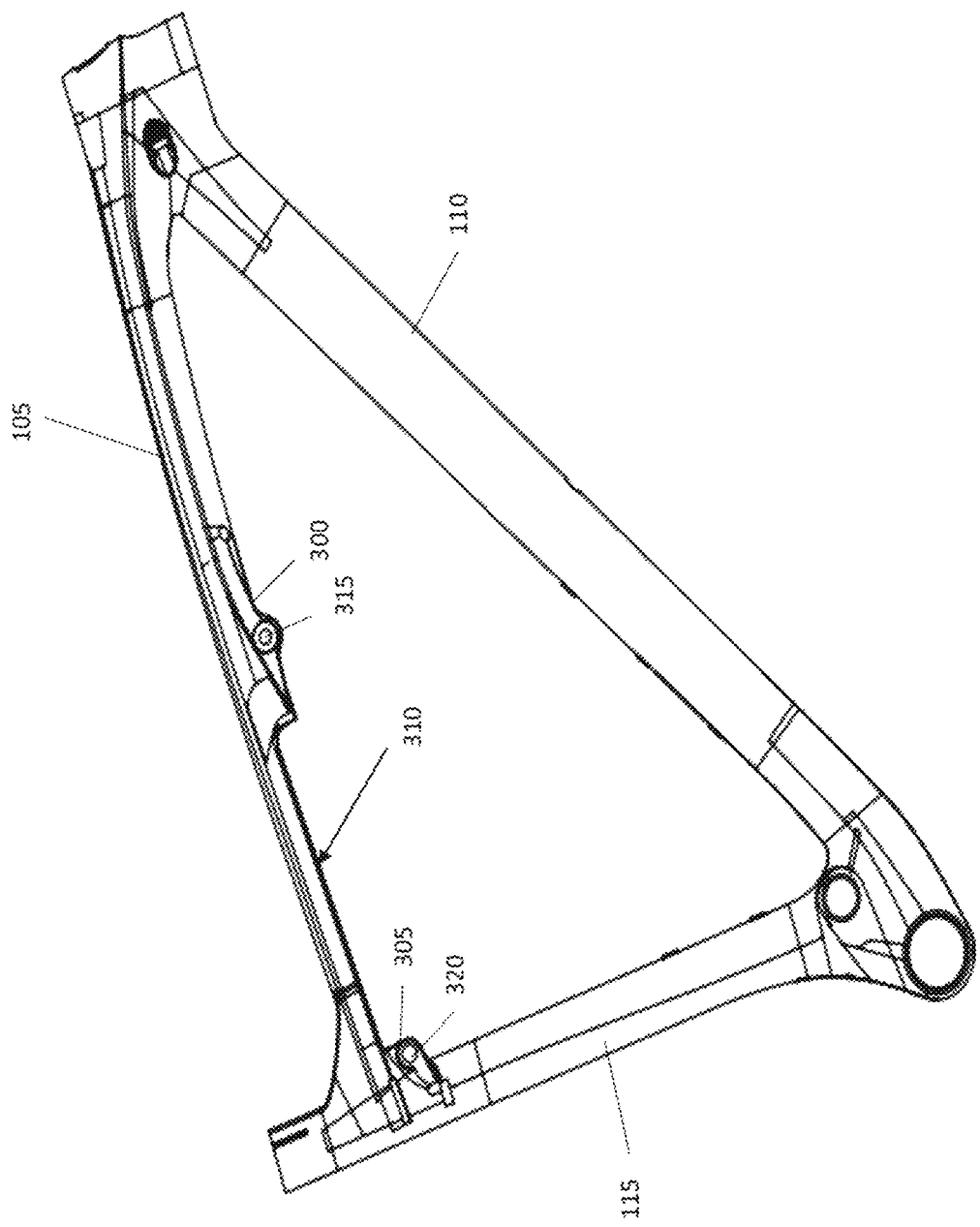

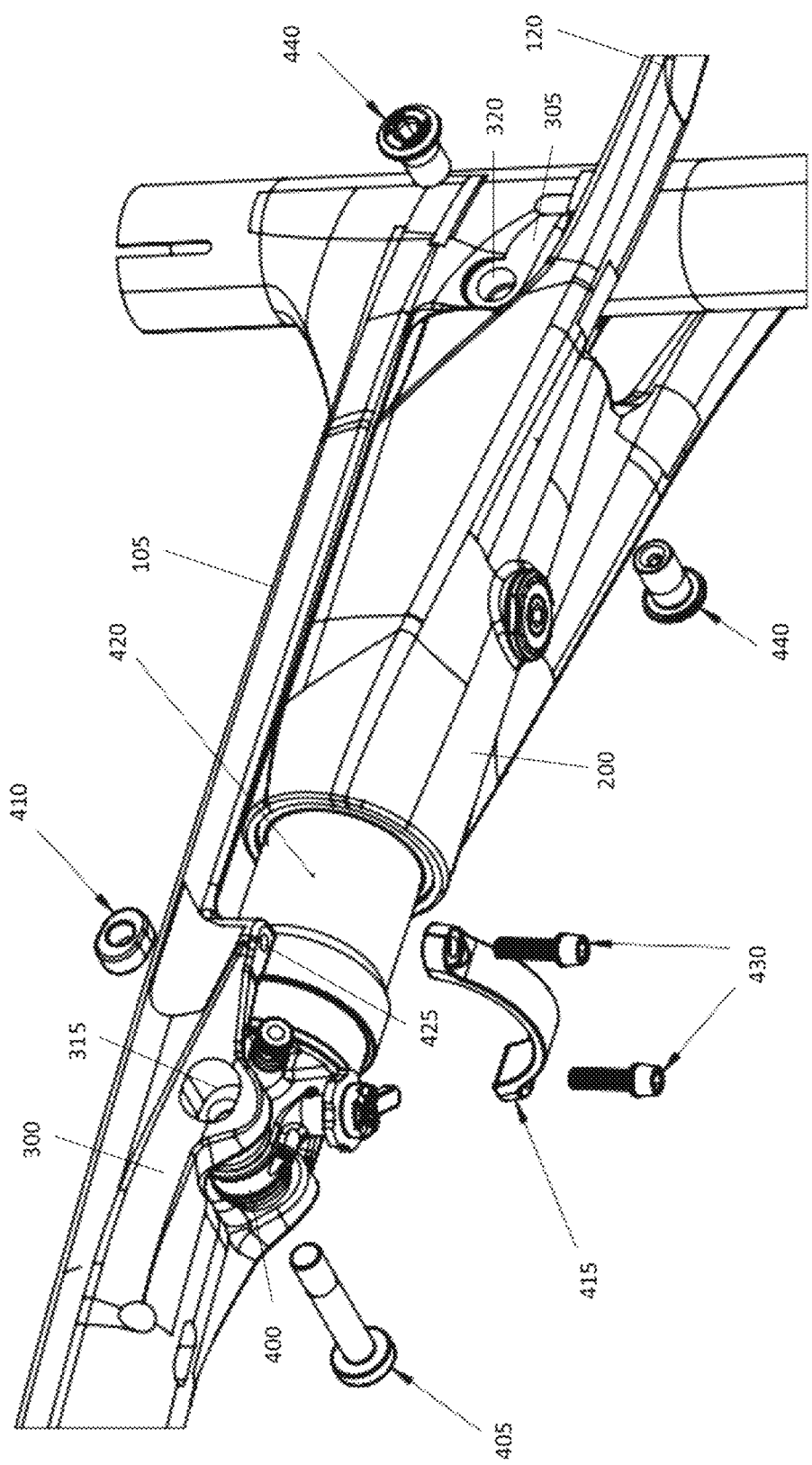

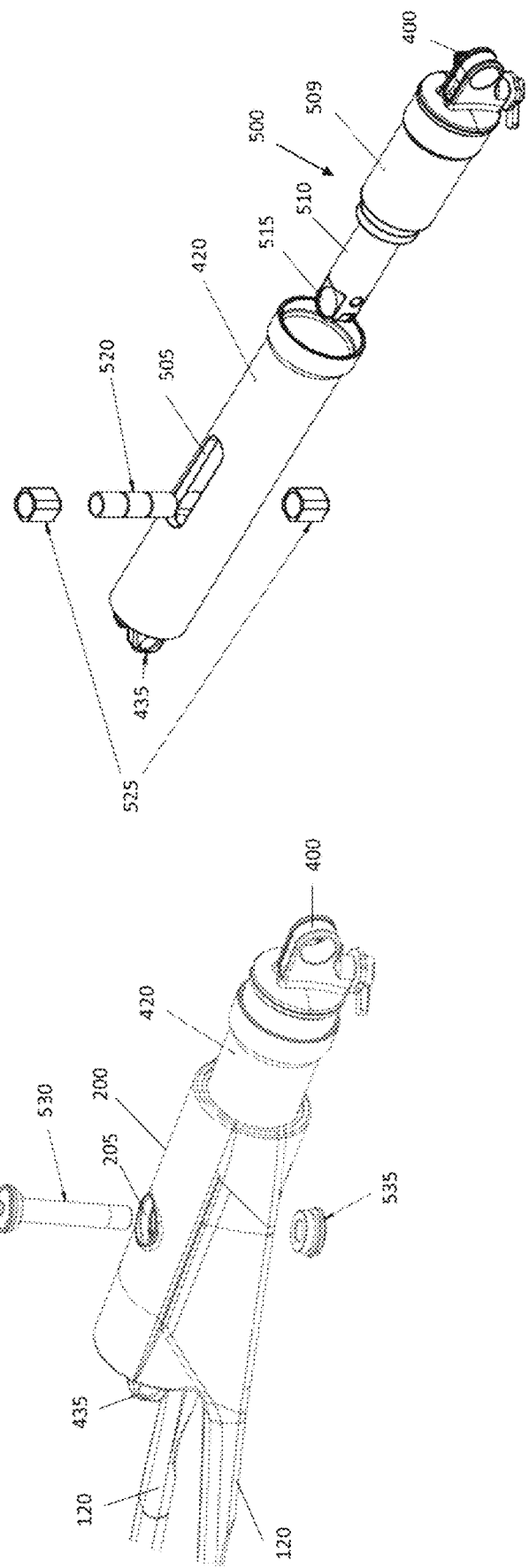

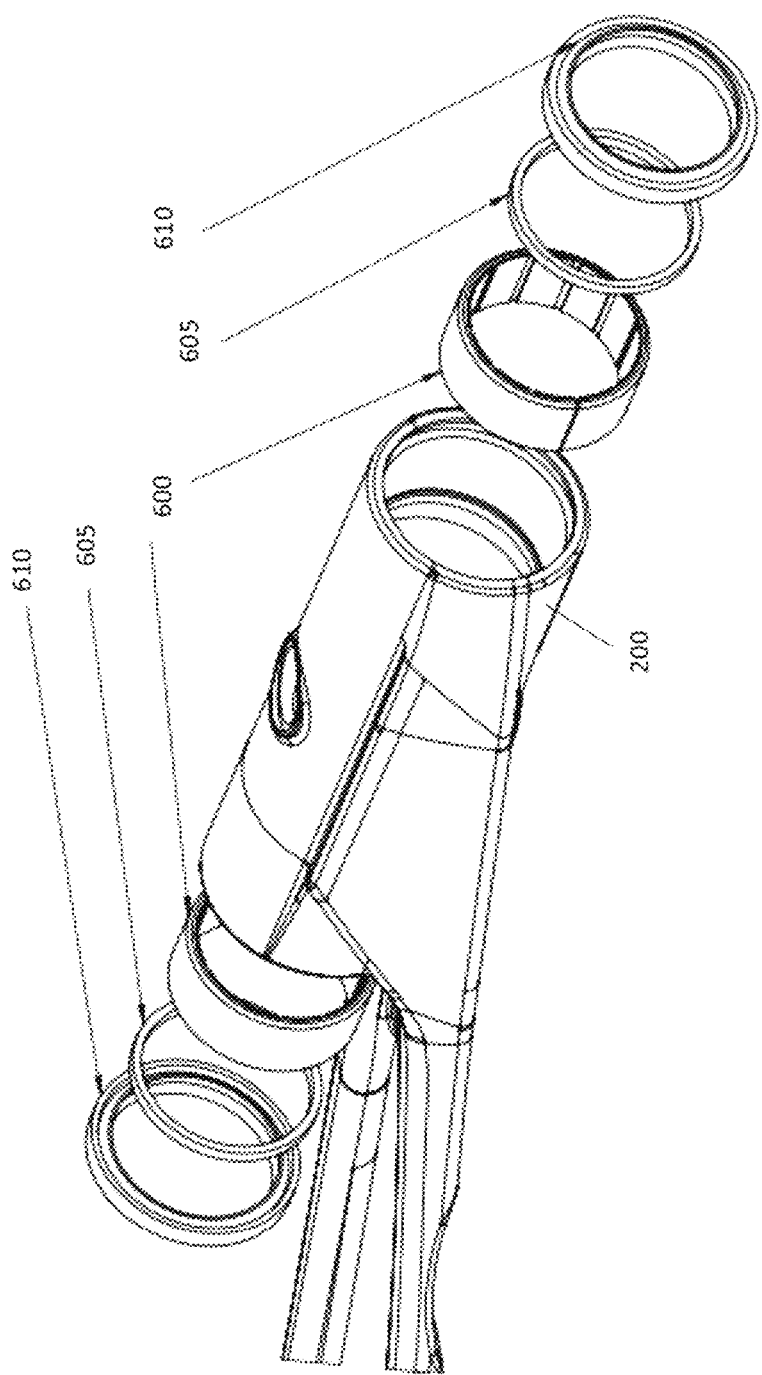

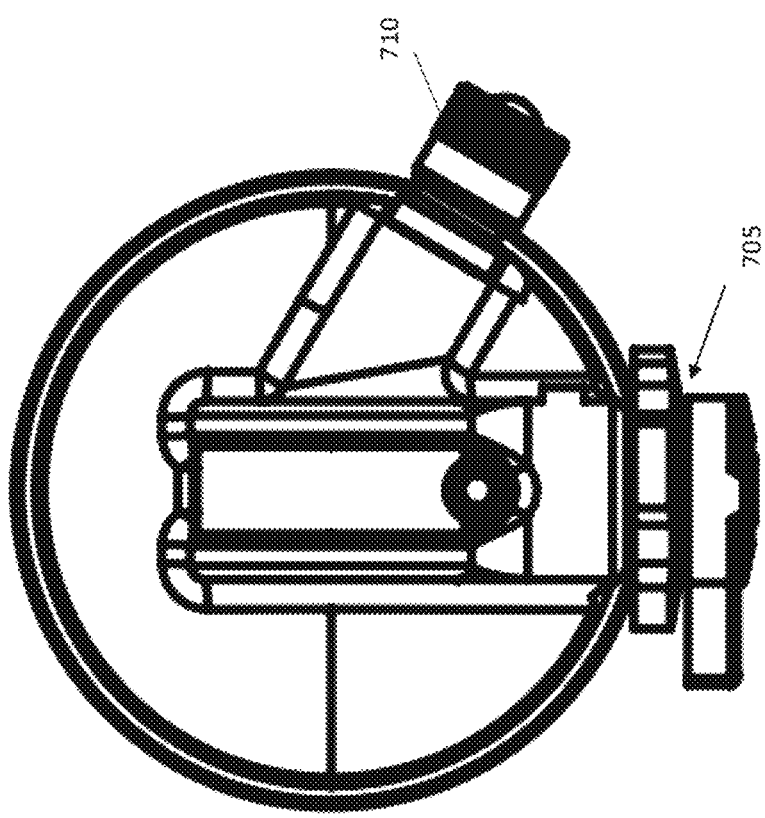

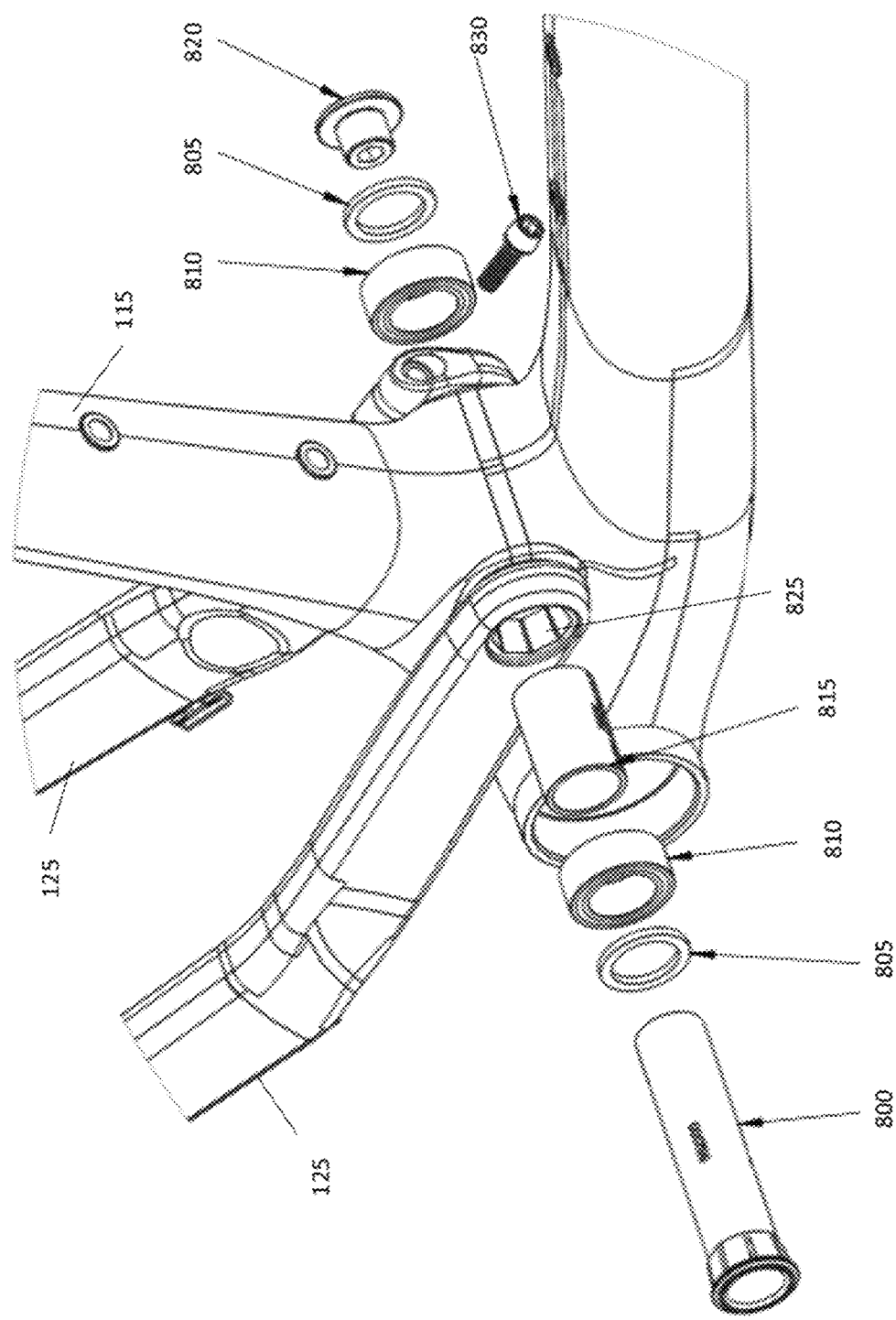

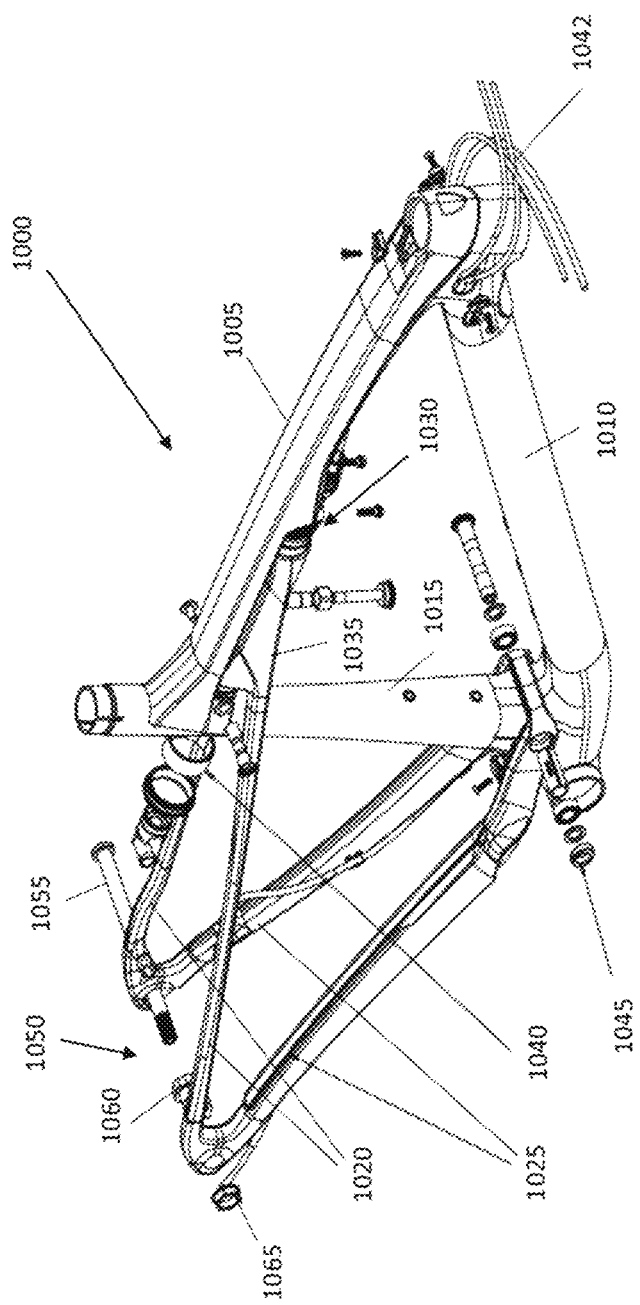

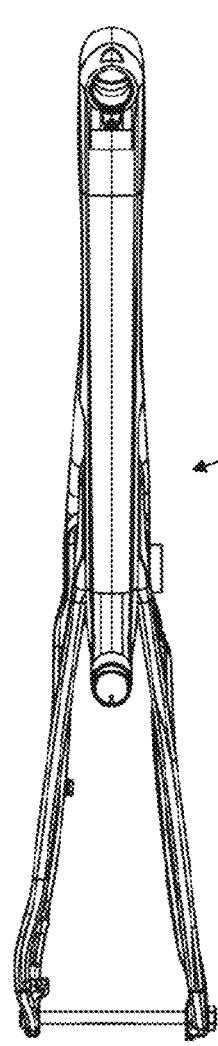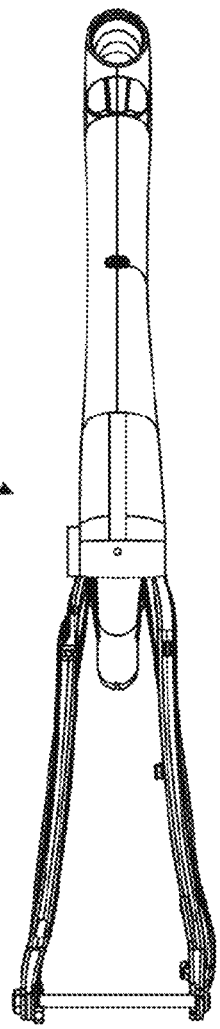

1190

1190

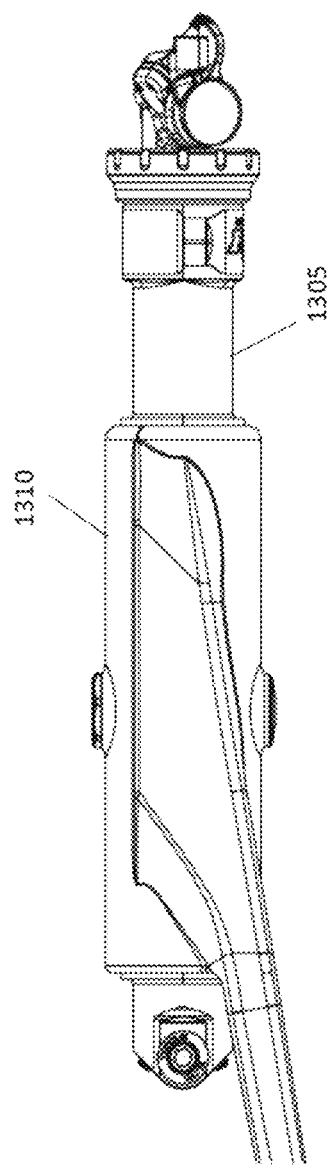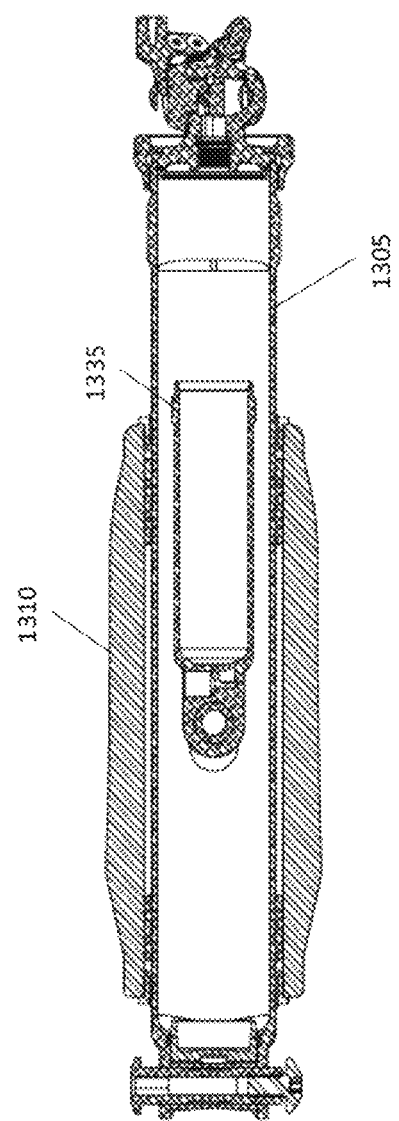
Fig. 13B
Fig. 13C

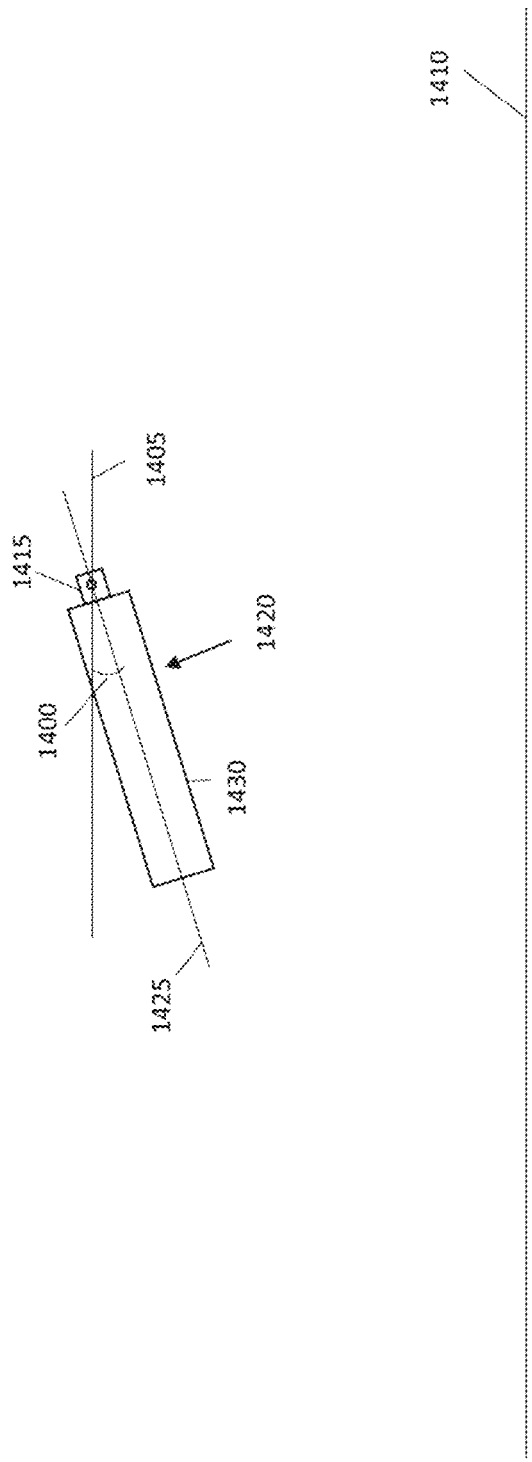

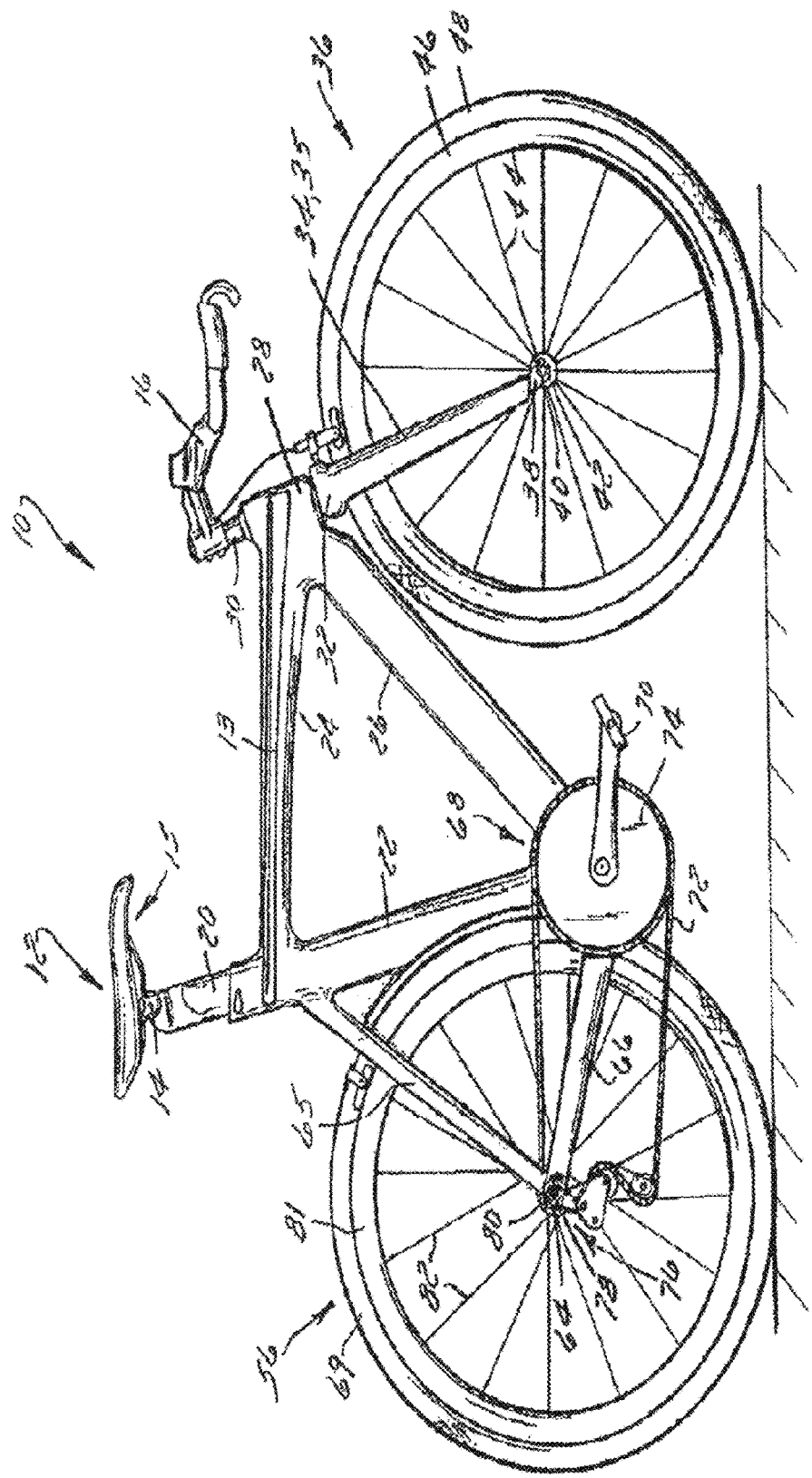

BICYCLE FRAME WITH INLINE SHOCK ASSEMBLY

CROSS-REFERENCE TO RELATED APPLICATION

The present application claims the priority benefit of U.S. Provisional Patent Application No. 62/609,193 filed on Dec. 21, 2017, the entire disclosure of which is incorporated by reference herein.

BACKGROUND

A bicycle frame can include a number of components that provide structural support for wheels, a handlebar, a seat/saddle, pedals, etc. A typical bicycle frame includes a top tube that is directly or indirectly mounted to both a seat tube and a down tube to form a front triangle. The seat tube is configured to support a saddle post, which in turn supports a saddle. The top tube and/or down tube are also mounted to a head tube, an upper portion of which is configured to support a handlebar, and a lower portion of which is configured to support front wheel forks. Seat stays extend toward a rear of the bicycle from the top tube and/or seat tube, and chain stays extend from the seat stays to a junction between the down tube and the seat tube.

SUMMARY

An illustrative bicycle frame includes a front triangle that has a top tube, a down tube, and a seat tube. A bottom side of the top tube includes a cavity. The bicycle frame also includes a seat stay assembly that has a first seat stay, a second seat stay, and a seat stay yoke that connects the first seat stay and the second seat stay. The seat stay yoke is configured to at least partially fit within the cavity on the bottom side of the top tube. The bicycle frame further includes an inline shock assembly that has a stanchion and a shock. At least a portion of the stanchion is configured to fit within the seat stay yoke.

An illustrative method of constructing a bicycle frame includes forming a front triangle that includes a top tube, a down tube, and a seat tube. Forming the front triangle includes forming a cavity on a bottom side of the top tube. The method also includes forming a seat stay assembly that includes a first seat stay, a second seat stay, and a seat stay yoke that connects the first seat stay and the second seat stay. The seat stay yoke is formed to at least partially fit within the cavity on the bottom side of the top tube. The method further includes mounting an inline shock assembly that includes a stanchion and a shock to the seat stay yoke and to the top tube.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several, embodiments in accordance with the disclosure and are, therefore, not to be considered limiting of its scope, the disclosure will be described with additional specificity and detail through use of the accompanying drawings.

FIG. 3 is a side view of the front triangle portion of a bicycle frame in accordance with an illustrative embodiment.

FIG. 4 is a partial, exploded view depicting how the shock assembly is mounted to the bicycle frame in accordance with an illustrative embodiment.

FIG. 5A depicts how the shock assembly is secured to the seat stay yoke in accordance with an illustrative embodiment.

FIG. 5B is an exploded view depicting how a shock of the shock assembly is secured to the stanchion in accordance with an illustrative embodiment.

FIG. 6 is an exploded view depicting sealing components of the seat, stay yoke in accordance with an illustrative embodiment.

FIG. 7 is a cross sectional end view of the shock assembly in accordance with an illustrative embodiment.

FIG. 8 is a partial exploded view depicting a mounting configuration for the chain stays in accordance with an illustrative embodiment.

FIG. 10 is a partially exploded perspective view of a bicycle frame in accordance with another illustrative embodiment.

FIG. 11G is a top view of the bicycle frame in accordance with an illustrative embodiment.

FIG. 11H is a bottom view of the bicycle frame in accordance with an illustrative embodiment.

FIG. 13B is a side view of the non-round shock assembly in accordance with an illustrative embodiment.

FIG. 13C is a cross-sectional top view of the non-round shock assembly in accordance with an illustrative embodiment.

FIG. 14 depicts a shock assembly angle of a shock assembly in accordance with an illustrative embodiment.

FIG. 15 depicts a bicycle in accordance with an illustrative embodiment.

DETAILED DESCRIPTION

In the context of a bicycle frame, compliance can refer to the amount of give or flex in the frame. A bicycle frame with low compliance is typically a stiff frame that does not flex or give significantly as the bicycle is ridden over terrain. Such a low compliance frame is desirable for certain types of bicycles, such as street racing bicycles. A bicycle frame with high compliance is typically a more flexible frame that is designed to provide a more comfortable ride as the bicycle traverses rougher terrain. As an example, mountain bikes are often designed with bicycle frames having high compliance. Bicycle frames can also be designed to have different amounts of compliance along different dimensions. For example, a frame may be designed to have high vertical compliance and low horizontal compliance (or vice versa).

Described herein is a bicycle frame that includes an incorporated inline shock assembly (or damping system) to help improve comfort and control for the rider. In an illustrative embodiment, the shock assembly includes a stanchion and a shock housed at least partially within the stanchion. As described in detail below, the shock is mounted to slots within the stanchion such that the shock is able to translate longitudinally within the stanchion. The stanchion is also mounted to the bicycle frame in multiple locations such that the shock assembly is a structural part of the bicycle frame.

Figure 1A:
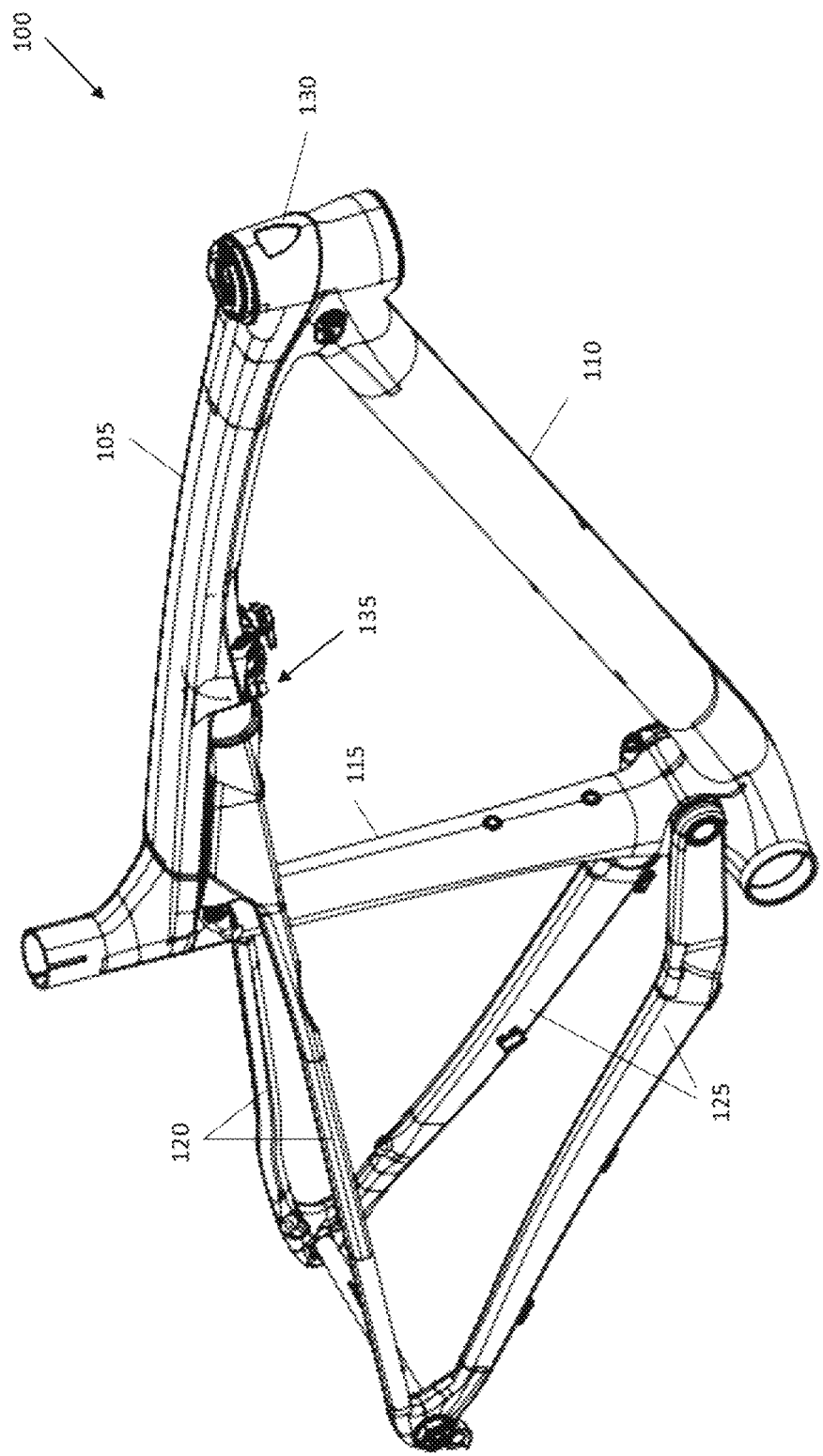
FIG. 1A is a perspective view of a bicycle frame in accordance with an illustrative embodiment.
Figure 1B:
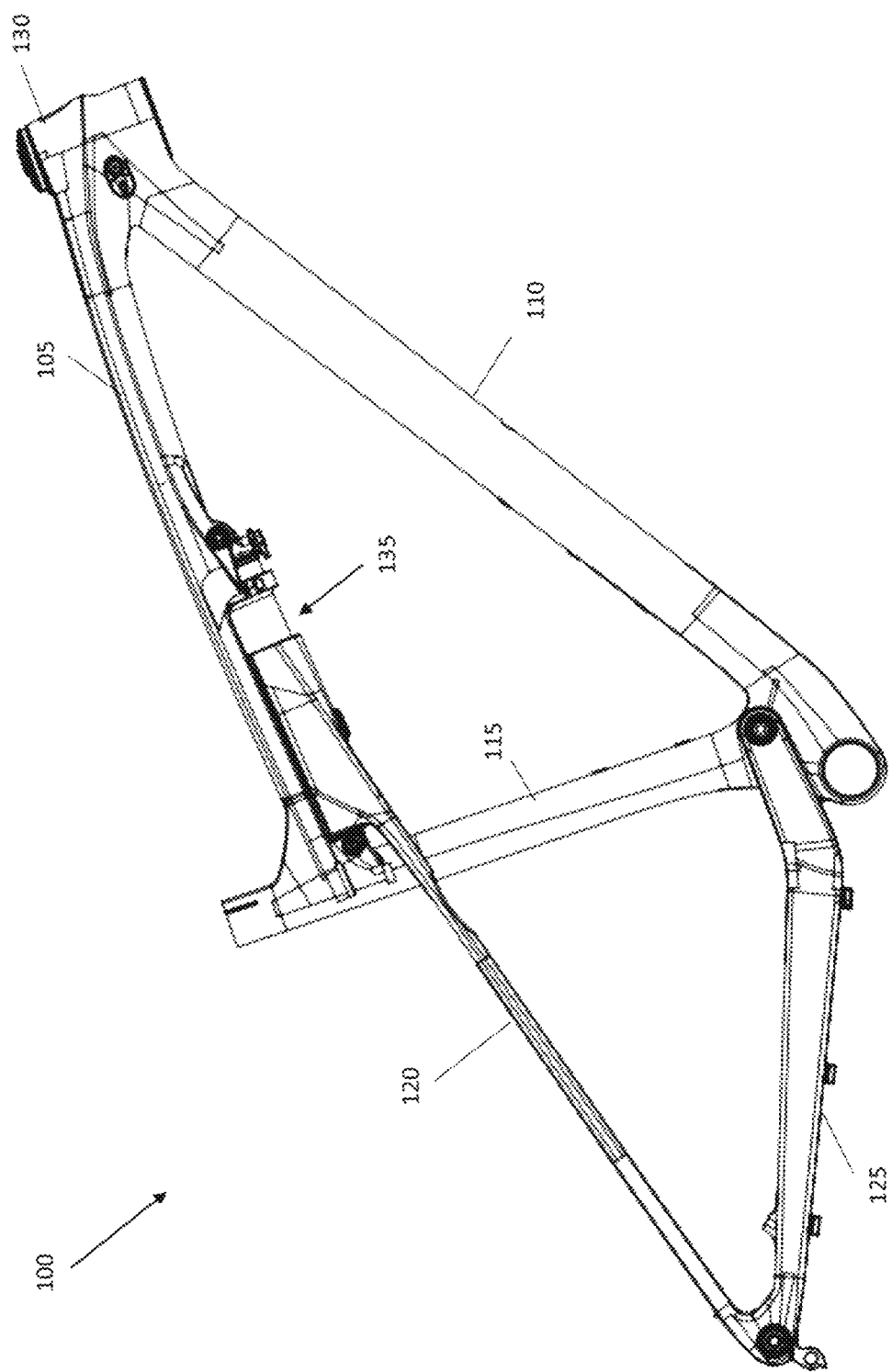
FIG. 1B is a side view of the bicycle frame of FIG. 1A in accordance with an illustrative embodiment.

FIG. 1A is a perspective view of a bicycle frame 100 in accordance with an illustrative embodiment. FIG. 1B is a side view of the bicycle frame 100 of FIG. 1A in accordance with an illustrative embodiment. The bicycle frame 100 includes a top tube 105, a down tube 110, a seat tube 115, seat stays 120, chain stays 125, a head tube 130, and a shock assembly 135. In an illustrative embodiment, the top tube 105, the down tube 110, and the seat tube 115 are formed as an integrated unit made from carbon, aluminum, or another suitable material. Similarly, the seat stays 120 and chain stays 125 can also be formed as an integral unit made of carbon, aluminum, or another material. As depicted in FIGS. 1A and 1B, the shock assembly 135 is held in part by the seat stays 120 and is mounted to the top tube 105 and the seat tube 115.

Figure 2B:
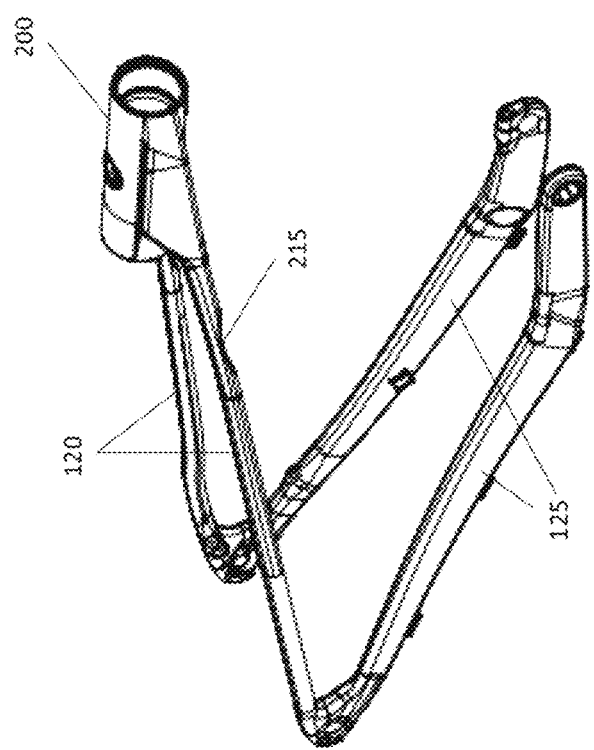
FIG. 2B is a perspective view of the seat stays and the chain stays in accordance with an illustrative embodiment.
Figure 2A:
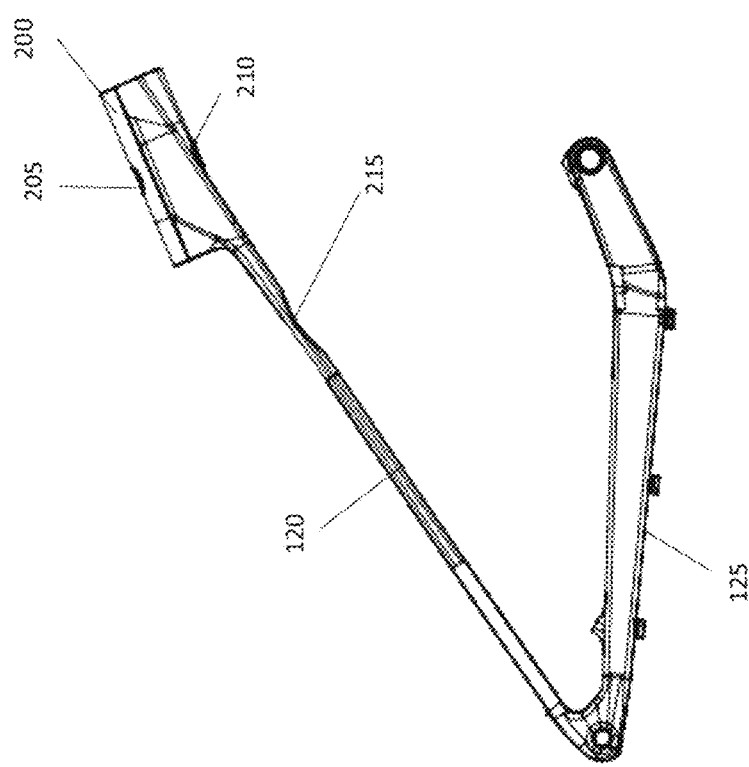
FIG. 2A is a side view of the seat stays and the chain stays in accordance with an illustrative embodiment.

FIG. 2A is a side view of the seat stays 120 and the chain stays 125 in accordance with an illustrative embodiment. FIG. 2B is a perspective view of the seat stays 120 and the chain stays 125 in accordance with an illustrative embodiment. The seat stays 120, which include a first seat stay and a second seat stay, join together to form a seat stay yoke 200. In an illustrative embodiment, the seat stays 120, the chain stays 125, and the seat stay yoke 200, which can be referred to as a seat stay assembly, are formed as an integral component made from carbon, aluminum, or another suitable material. In an alternative embodiment, the seat stays 120, chain stays 125, and/or seat stay yoke 200 can be formed as separate components that are mounted to one another using any techniques known to those of skill in the art.

The seat stay yoke 200 is configured to receive and hold a stanchion of the above-referenced shock assembly 135, as discussed in more detail below. In an illustrative embodiment, the seat stay yoke 200 is in the form of a cylinder that includes a cylindrical cavity configured to receive the stanchion of the shock assembly 135. The seat stay yoke 200 includes an upper opening 205 and a lower opening 210, which are configured to receive a fastener such that the shock assembly 135 is secured to the seat stay yoke 200. As best depicted in FIG. 2A, each of the seat stays includes a relief cut 215. The relief cuts 215 are used to increase the flexibility of the seat stays 125 such that the overall system functions properly. In an alternative embodiment, the relief cuts 215 may not be used, and the flexibility can be imparted to the seat stays 125 using any other techniques known in the art.

FIG. 3 is a side view of the front triangle portion of a bicycle frame in accordance with an illustrative embodiment. As shown in FIG. 3, a mounting bracket 300 is incorporated onto a bottom side of the top tube 105, and a mounting bracket 305 is incorporated onto a forward facing portion of the seat tube 115. Each of the mounting brackets 300 and 305 includes a pair of through holes that are configured to receive a fastener such that the shock assembly 135 depicted in FIGS. 1A and 1B can be secured to the frame. Specifically, a first mounting flange of the shock assembly is secured between a pair of through holes 315 of the mounting bracket 300 and a second mounting flange of the shock assembly 135 is secured between a pair of through holes 320 formed in the mounting bracket 305. The through holes 315 and 320 may have internal threads configured to mate with a threaded fastener in at least some embodiments. Alternatively, the through holes 315 and 320 may not include threads. In another alternative embodiment, each of the mounting brackets 300 and 305 may include a single through hole for mounting the shock assembly 35 instead of a pair of through holes. In an illustrative embodiment, the mounting brackets 300 and 305 can be formed of the same material as the bicycle frame and can be integrally formed on the bicycle frame. Alternatively, the mounting brackets 300 and 305 can be made from a different material than the frame and/or may mounted to the bicycle frame using any techniques known in the art.

As also shown in FIG. 3, a bottom side of the top tube 105 includes a cutout that forms a partial cavity 310 configured to receive the seat stay yoke 200 depicted in FIGS. 2A and 2B. In an illustrative embodiment, the partial cavity 310 includes a partially circular contour that is configured to conform to a portion of the cylindrical surface of the seat stay yoke 200 that is in contact with the top tube 105. The partial cavity 310 can be integrally formed into the top tube 105 during construction of the bicycle frame. Alternatively, the partial cavity 310 may be cut into the top tube 105 after the top tube 105 is formed.

FIG. 4 is a partial, exploded view depicting how the shock assembly 135 is mounted to the bicycle frame in accordance with an illustrative embodiment. As depicted in FIG. 4, the seat stay yoke 200 is positioned within the partial cavity 310 (see FIG. 3) formed in the top tube 105. The shock assembly, the components of which are described in more detail with reference to FIGS. 5-8, includes a first mounting flange 400 which is secured to the through holes 315 of the mounting bracket 300. In an illustrative embodiment, a fastener 405 extends through a first of the through holes 315 on the mounting bracket 300, through the mounting flange 400 of the shock assembly, and through a second of the through holes 315 on the mounting bracket 300. The fastener 405 can be a bolt, screw, pin, etc. A cap 410 can be mounted to an end of the fastener 405 to help ensure that the fastener 405 does not back out. The cap 410 can be in the form of a nut which threads onto the fastener 405. In another illustrative embodiment, the second of the through holes 315 can have a same shape as the cap 410 and can be sized to receive at least a portion of the cap 410 such that the cap 410 is unable to rotate while the fastener 405 is tightened or loosened. The through holes 315 and/or the hole in the mounting flange 400 can be threaded or unthreaded, depending on the embodiment.

The shock assembly is also secured to the mounting bracket 300 by way of a stanchion mount 415 which is configured to contact and secure a stanchion 420 of the shock assembly. The stanchion 420, which is at least partially mounted within the seat stay yoke 200, is described in more detail below. The mounting bracket 300 includes a pair of threaded holes 425 which are configured to receive fasteners 430 such that the stanchion mount 415 can be secured to the mounting bracket 300. In an alternative embodiment, the stanchion mount 415 can be incorporated as an integral part of the stanchion 420. In another alternative embodiment, a second stanchion mount can be used in addition to the stanchion mount 415 to secure a rear portion of the stanchion 420 to the frame.

A rear portion of the shock assembly includes a second mounting flange 435 which is mounted between the through holes 320 of the mounting bracket 305. The second mounting flange 435 is visible in the views of FIGS. 5-8. Fasteners 440 are used to secure the second mounting flange in between the through holes 320. In one embodiment, the through holes 320 and a hole in the second mounting flange 435 are threaded and one of the fasteners 440 is threaded into each of the through holes 320 and partially into the hole of the second mounting flange 435. Alternatively, a single fastener 440 may be used along with a cap/nut to secure the fastener 440. In such an embodiment, the through holes 320 and/or the hole in the second mounting flange 435 may not be threaded. The fastener(s) 440 can be in the form of a bolt, screw, pin, etc.

Figure 5C:
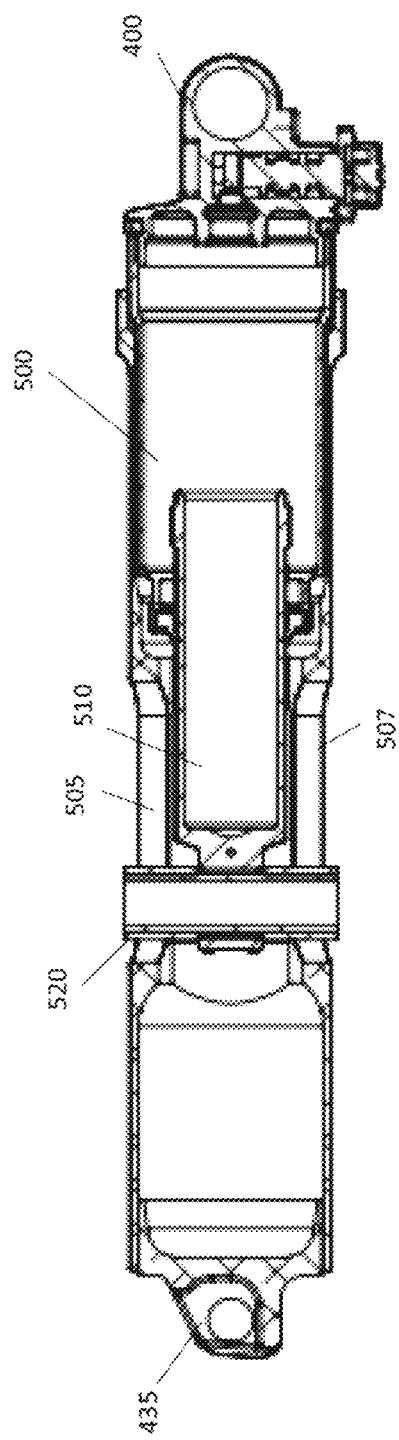
FIG. 5C is a cross-sectional side view of the shock and stanchion in accordance with an illustrative embodiment.

FIG. 5A depicts how the shock assembly 135 is secured to the seat stay yoke 200 in accordance with an illustrative embodiment. FIG. 5B is an exploded view depicting how a shock 500 of the shock assembly is secured to the stanchion 420 in accordance with an illustrative embodiment. FIG. 5C is a cross-sectional side, view of the shock 500 and stanchion 420 in accordance with an illustrative embodiment.

The stanchion 420 is in the form of a cylindrical tube that is configured to be at least partially housed within the seat stay yolk 200, as shown in FIG. 5A. In an illustrative embodiment, the stanchion 420 can have a diameter of 36 millimeters (mm). Alternatively, the diameter of the stanchion can be a different value, such as 32 mm, 40 mm, 44 mm, etc. The stanchion 420 and other components of the shock assembly can be made from lightweight components such as plastic, carbon, aluminum, etc.

As shown in FIG. 5B, the stanchion 420 includes an upper longitudinal slot 505. Additionally, a lower longitudinal slot 507 (visible in FIG. 5C) is formed on the bottom of the stanchion 420 and aligned with the upper longitudinal slot 505. The shock 500 includes a front portion 509 and a rear portion 510, where the rear portion 510 is of a smaller diameter than the front portion 509. The rear portion 510 of the shock 500 includes a mounting hole 515 therein. A mounting sleeve 520 is configured to run through the mounting hole 515 on the rear portion 510 of the shock 500, and the mounting sleeve 520 is configured to run through spacer bushings 525. The spacer bushings 525 are configured to be positioned within the upper longitudinal slot 505 and the lower longitudinal slot 507 such that the spacer bushings 525 are able to translate longitudinally along the stanchion 420. In an illustrative embodiment, an interior surface of the upper longitudinal slot 505 and the lower longitudinal slot 507 can be formed from a low friction material (e.g., aluminum, plastic, etc.) and/or treated with a low friction coating to facilitate low friction translation of the spacer bushings 525 within the slots. Similarly, an outer surface of the spacer bushings 525 can also be formed from a low friction material and/or treated with a low friction coating to facilitate low friction translation. In one embodiment, the spacer bushings 525 can be formed from a hard plastic material. Alternatively, another material may be used such as carbon, aluminum, etc.

To secure the shock assembly to the seat stay yoke 200, a fastener 530 is placed through the upper opening 205 in the seat stay yoke 200, through the mounting sleeve 520, and through the lower opening 210 in the seat stay yoke 200. Alternatively, the fastener 530 may be mounted in the opposition direction. The fastener 530, which can be a bolt, is secured by a cap 535, which can be a threaded nut or other threaded component that is configured to receive threads of the fastener 530.

Thus, to summarize the mounting of the shock assembly, the seat stay yoke 200 is positioned within a partial cavity 310 formed on a bottom side of the top tube 105, and the stanchion 420 of the shock assembly is positioned within the seat stay yoke 200. A first mounting flange 400 of the shock 500 is secured to a mounting bracket 300 on the top post 105 of the bicycle frame. A second mounting flange 435 of the stanchion 420 is secured to a mounting bracket 305 on the seat post 115 of the bicycle frame. Additionally, the mounting sleeve 520 is placed through the mounting hole 515 on the rear portion 510 of the shock 500 and positioned within the upper longitudinal slot 505 and the lower longitudinal slot 507 formed in the stanchion 420. The spacer bushings 525 are placed over the mounting sleeve 520, one on top of the mounting hole 515 of the shock 500 and one below the mounting hole 515 of the shock 500. As a result, the spacer bushings 525 are positioned such that they are able to translate longitudinally within the upper and lower longitudinal slots. Lastly, a fastener is placed through the upper opening 205 in the seat stay yoke 200, through the mounting sleeve 520, and through the lower opening 210 in the seat stay yoke 200 such that the shock assembly is secured to the seat stay yoke 200.

As a result of this mounting configuration, the mounting sleeve 520 (and the spacer bushings 525 surrounding it) is able to translate longitudinally along the stanchion 420 as the shock 500 moves. The mounting sleeve 520 is also able to translate longitudinally along the stanchion 420 as the seat stay yoke 200 moves in response to stresses on the bicycle frame from the rider and the surface on which the bicycle is driven. Specifically, torsional loads from the seat stays go through, the stanchion to the mounting sleeve 520 such that the shock 500 is able to absorb at least a portion of the torsional load. Specifically, torsional loads are transferred through the fastener 530, the mounting sleeve 520, and the spacer bushings 525, and react against the stanchion 420 and the frame. This results in a firm frame in response to pedaling input loads, and in which the rear wheel is able to move through travel independent of the pedaling loads. The user therefore experiences a more comfortable and controlled riding experience.

In an illustrative embodiment, the seat stay yoke 200 can be a sealed unit that houses at least a portion of the stanchion 420 of the shock assembly. FIG. 6 is an exploded view depicting sealing components of the seat stay yoke 200 in accordance with an illustrative embodiment. Positioned at each end of the seat stay yoke 200 is a bushing 600, a foam ring 605, and a wiper seal 610. These components are used to form a seal between the stanchion 420 of the shock assembly and the seat stay yoke 200. The seals help prevent dirt and other contaminants from getting into the seat stay yoke 200. In an illustrative embodiment, the seals are also used to contain a lubricant within the seat stay yoke 200 to reduce friction as the shock 500 and/or stanchion 420 translate longitudinally within the seat stay yoke 200. In an illustrative embodiment, the lubricant can be oil. Alternatively, any other lubricant may be used.

The bushings 600 have a low friction inner surface and are in contact with the stanchion. Along with the stanchion 420, the bushings 600 act as a general linear guide for translation of the shock 500. The foam rings 605 are used to wick the lubricant such than an entire exterior perimeter of the stanchion 420 is in contact with the lubricant. The wiper seals 610 also form a seal around a perimeter of the stanchion and act to scrape/wipe the lubricant from the exterior surface of the stanchion as the stanchion translates longitudinally within the seat stay yoke 200. As a result, the lubricant is contained and unable to exit through the openings at the ends of the seat stay yoke 200 and dirt and debris is unable to enter the system. In an illustrative embodiment, the lubricant within the seat stay yoke 200 can be periodically changed by a user or technician, along with the bushings 600, foam rings 605, and wiper seals 610.

FIG. 7 is a cross sectional end view of the shock assembly in accordance with an illustrative embodiment. As depicted in FIG. 7, the shock assembly includes a lockout switch 705 that is used to adjust the damping force of the shock. Additionally, an air valve 710 is used to allow the user to add air pressure to or remove air pressure from the shock can such that the spring, rate of the overall system can be adjusted.

In one embodiment, the bicycle frames described herein includes a bridge across the chain stays 125 to help ensure that the chain stays 125 move in unison as the bicycle is ridden over a surface. In another embodiment, such a bridge is not included, and a contoured pivot axle is instead used to secure the chain stays 125 to the seat tube 115. FIG. 8 is a partial exploded view depicting a mounting configuration for the chain stays 125 in accordance with an illustrative embodiment. A mounting assembly for mounting the chain stays 125 includes a pivot axle 800, end spacers 805, double row bearings 810, a bearing spacer 815, and a fastener 820. The components of the mounting assembly for the chain stays 125 can be made from plastic, carbon, aluminum, stainless steel, or another suitable material.

In an illustrative embodiment, the bearing spacer 815 is positioned within a through hole of the seat tube, and each end of the bearing spacer 815 is adjacent to one of the double row bearings 810. In an alternative embodiment, any other type of bearing may be used. Adjacent to the double row bearings 810 are the end spacers 805, which are used to ensure that the mounting assembly is properly positioned and aligned. The end spacers 805 can be washers in one embodiment. In an alternative embodiment, the end spacers 805 may not be used.

The pivot axle 800 is sized such that it fits within the end spacers 805, the double row bearings 810, and the bearing spacer 815. As depicted in FIG. 8, a through hole 825 formed in each of the chain stays 125 has an octagonal contour. In an alternative embodiment, a different type of contour may be used for the through holes 825, such as hexagonal, square, pentagonal, etc. In an illustrative embodiment, each end of the pivot axle 800 also has an octagonal contour matching that of the through holes 825. In an alternative embodiment, one end of the pivot axle 800 can have an octagonal contour and an opposite end of the pivot axle 800 can be round. In such an embodiment, the round end can be clamped into a second of the seat stays 125 such that a load transfer is created through frictional force. As a result, in either embodiment, when the pivot axle 800 is secured by the fastener 820, the pivot axle 800 is unable to pivot/rotate independent of the chain stays 125, and vice versa. The chain stays 125 are therefore essentially locked in unison such that any rotation which occurs about the pivot axle 800 is the same for both chain stays 125. In other words, the mounting configuration of FIG. 8 helps ensure that the chain stays 125 cannot rotate independent of one another, which reduces sloppiness in the bicycle frame due to tire movement.

In an illustrative embodiment, the fastener 820 is a bolt that is configured to thread into the pivot axle 800 to secure the mounting assembly for the chain stays 125. In alternative embodiments, any other type of fastener or fastening system may be used. A fastener 830 is used to clamp the chain stays 125 around the pivot axle 800.

Figure 9:
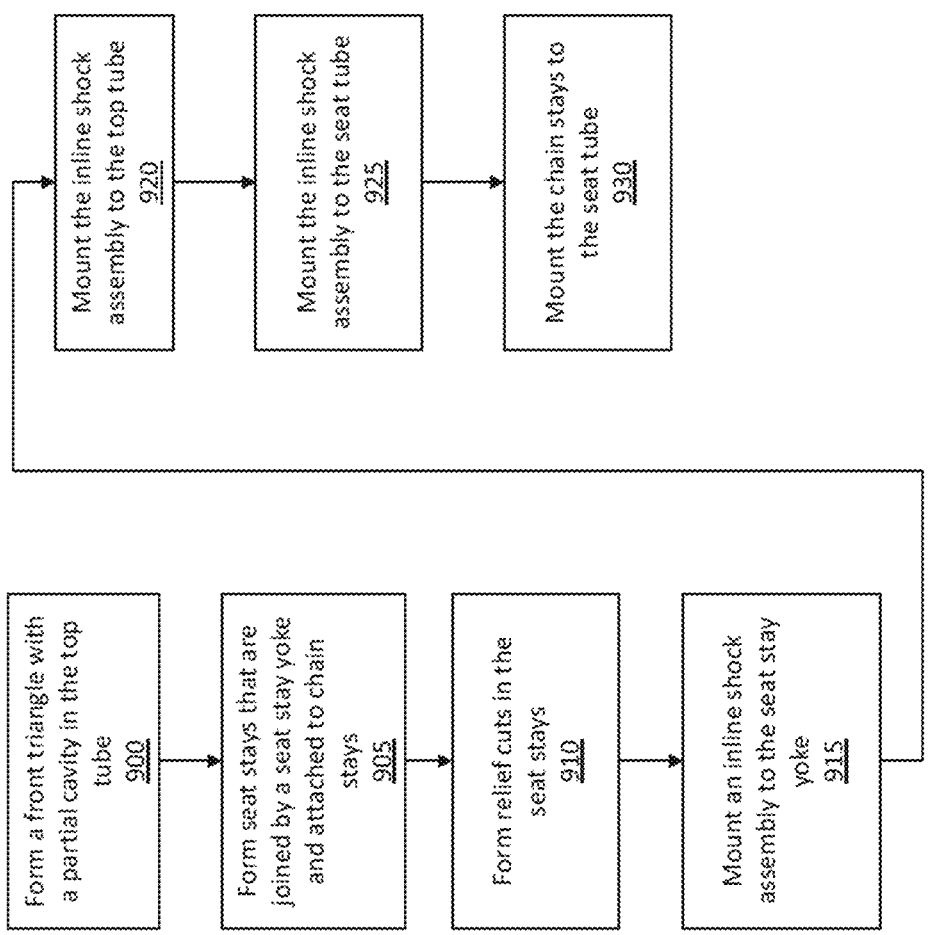
FIG. 9 is a flow diagram depicting operations performed to construct a bicycle frame with an inline shock assembly in accordance with an illustrative embodiment.

FIG. 9 is a flow diagram depicting operations performed to construct a bicycle frame with an inline shock assembly in accordance with an illustrative embodiment. In alternative embodiments, fewer, different, and/or additional operations may be performed. Additionally, the use of a flow diagram is not intended to be limiting with respect to the order of operations performed. In an operation 900, a front triangle for a bicycle frame is formed such that the top tube includes a partial cavity configured to receive a seat stay yoke. The partial cavity may be molded into the top tube, or alternatively may be cut into the top tube after the top tube is formed. The front triangle, which includes the top tube, a down tube, and a seat tube, can also include a mounting bracket formed on the top tube and a mounting bracket formed on the seat tube. In an alternative embodiment, the mounting brackets may be added after the front triangle is formed.

In an operation 905, seat stays are formed. The seat stays are joined by a seat stay yoke, and are integrally attached to chain stays. In an alternative embodiment, the seat stays and chain stays can be formed separately and mounted together. In an operation 910, relief cuts are formed in the seat stays to improve the flexibility of the bicycle frame. The relief cuts can be formed by a cutting process or any other material removal process. Alternatively, the relief cuts may be molded into the seat stays when the seat stays are formed in the operation 905.

In an operation 915, an inline shock assembly is mounted to the seat stay yoke. In an illustrative embodiment, the inline shock assembly can be mounted to the seat stay yoke as depicted and described with reference to FIG. 5A. The inline shock assembly is mounted to the top tube of the front triangle in an operation 920. In an operation 925, the inline shock assembly is mounted to the seat tube. In an illustrative embodiment, the inline shock assembly is mounted to the top tube and the seat tube as depicted and described with reference to FIG. 4. In an operation 930, the chain stays are mounted to the seat tube. In an illustrative embodiment, the chain stays are mounted such that they are locked together and unable to rotate independent of one another. The chain stays can be mounted using a mounting assembly as described with reference to FIG. 8.

FIGS. 10 and 11 depict an alternative configuration of a bicycle frame that incorporates a shock assembly. Specifically, FIG. 10 is a partially exploded perspective view of a bicycle frame 1000 in accordance with an illustrative embodiment. The bicycle frame 1000 of FIG. 10 includes a top tube 1005, a down tube 1010, a seat tube 1015, seat stays 1020, and chain stays 1025. A shock assembly 1030 is mounted to the bicycle frame 1000. More specifically, the shock assembly 1030 is mounted to the seat tube 1015, the top tube 1005 and a seat stay yoke 1035 that joins the seat stays 1020. Mounting of the shock assembly 1030 is described in more detail with reference to FIGS. 11A and 11B. A sealing assembly 1040, described with reference to FIG. 11D, is used to seal the shock assembly 1030 in the seat stay yoke 1035. As depicted in FIG. 10, cables 1042 are routed internal to the bicycle frame 1000. The cables 1042 can include one or more shifting cables, one or more break cables, one or more dropper post cables, one or more remote shock lockout cables, etc. In an alternative embodiment, the cables 1042 can be positioned external to the bicycle frame 1000.

Figure 11B:
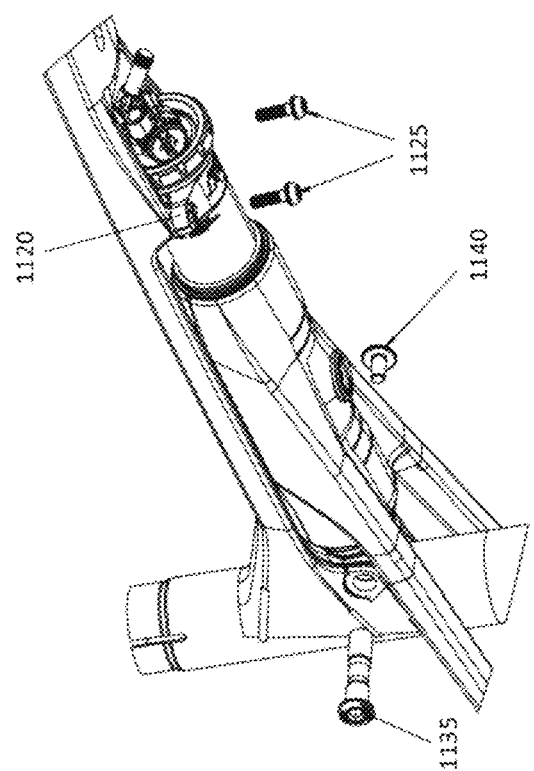
FIG. 11B depicts how the shock assembly is secured to a top tube and a seat tube of the bicycle frame in accordance with an illustrative embodiment.
Figure 11A:
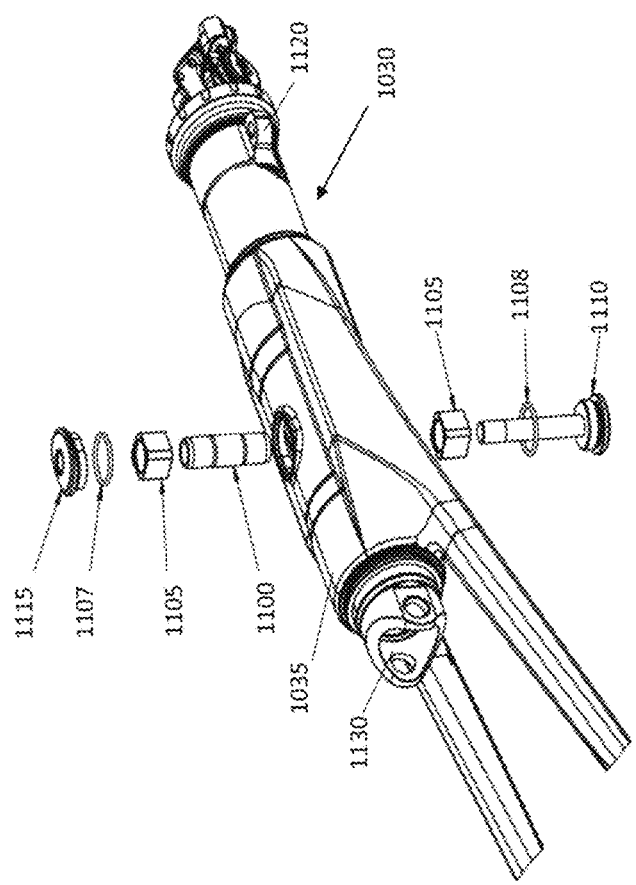
FIG. 11A depicts how the shock assembly of FIG. 10 is secured to a seat stay yoke of the bicycle frame in accordance with an illustrative embodiment.
Figure 11D:
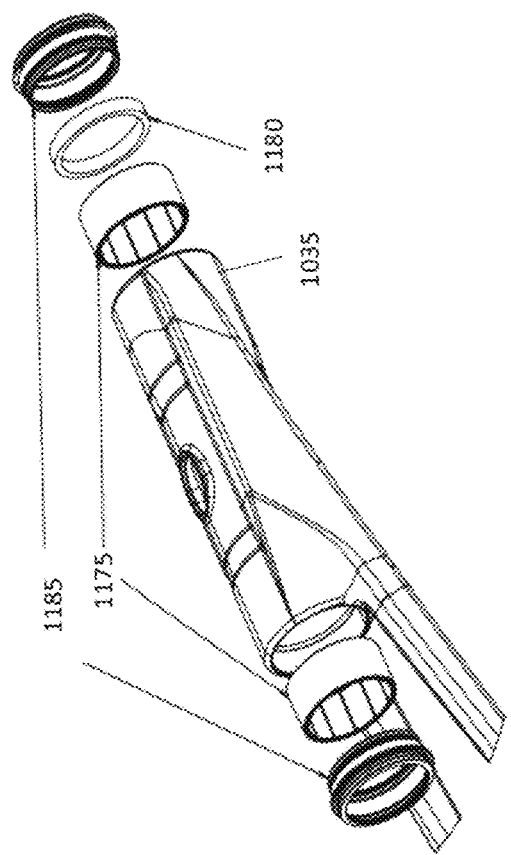
FIG. 11D is an exploded view depicting the sealing assembly of the seat stay yoke in accordance with an illustrative embodiment.
Figure 11C:
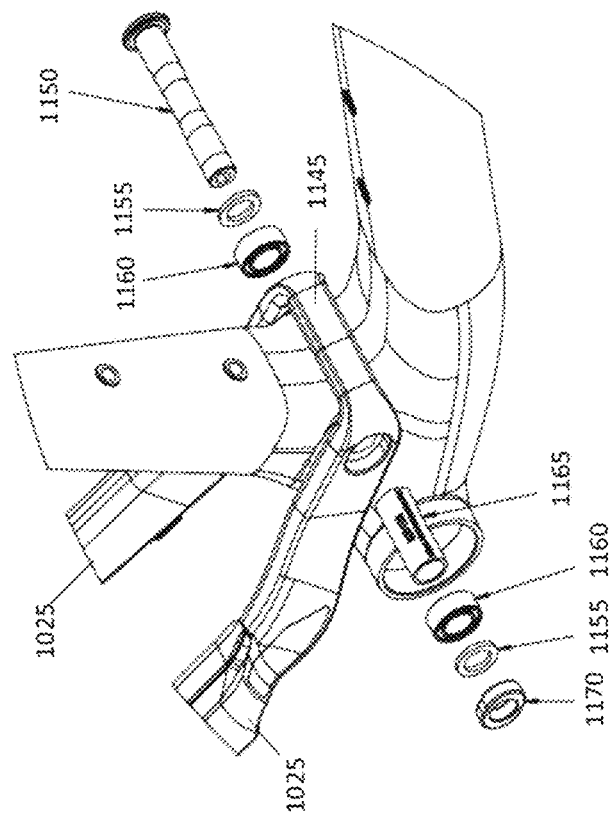
FIG. 11C is a partial exploded view depicting a mounting configuration for the chain stays of the bicycle frame in accordance with an illustrative embodiment.

A chain stay assembly 1045, which is described in more detail with reference to FIG. 11C, is used to secure the chain stays 1025 to the remainder of the bicycle frame 1000. An axle assembly 1050 is used to secure a rear wheel to the bicycle frame 1000. The axle assembly 1050 includes a rear axle 1055, a derailleur hanger 1060, and a nut 1065. To mount a rear wheel to the bicycle frame 1000, the rear axle 1055 goes through a first opening in the stays, through the wheel (not shown), through an opening in the derailleur hanger 1060, and through a second opening in the stays which is opposite the first opening. The nut 1065 is secured to a threaded end of the rear axle 1055 to secure the wheel and the axle assembly 1050. In alternative embodiments, a different type of rear axle assembly may be used.

FIG. 11A depicts how the shock assembly 1030 is secured to the seat stay yoke 1035 of the bicycle frame 1000 in accordance with an illustrative embodiment. Similar to the embodiment described with reference to FIGS. 5A and 5B, a mounting sleeve 1100 and spacer bushings 1105 are used to secure a shock of the shock assembly 1030 to a stanchion of the shock assembly 1030. The mounting sleeve 1100 fits within the spacer bushings 1105 as described herein, and an upper o-ring 1107 and a lower o-ring 1108 are used to help contain lubricant within the seat stay yoke 1035. To secure the shock assembly 1030 to the seat stay yoke 1035, a fastener 1110 is placed through the lower o-ring 1108, through a lower opening in the seat stay yoke 1035, through the mounting sleeve 1100, through an upper opening in the seat stay yoke 1035, and through the upper o-ring 1107. Alternatively, the fastener 1110 may be mounted in the opposition direction. The fastener 1110, which can be a bolt, is secured by a cap 1115, which can be a threaded nut or other threaded component that is configured to receive threads of the fastener 1110.

FIG. 11B depicts how the shock assembly 1030 is secured to a top tube 1005 and a seat tube 1015 of the bicycle frame 1000 in accordance with an illustrative embodiment. The shock assembly 1030 includes a pair of integral brackets 1120 that are used to secure the shock assembly 1030 to the top tube 1005 of the bicycle frame 1000. The integral brackets 1120 can be welded onto a stanchion or other portion of the shock assembly 1030, attached to the shock assembly 1030 using fasteners, or otherwise integrally mounted thereto. The integral brackets 1120 align with mounting holes in the top tube 1005 that are configured to receive fasteners 1125 so that the shock assembly is secured to the top tube 1005. As depicted, the shock assembly 1030 includes 2 integral brackets 1120 and 2 corresponding fasteners 1125. In alternative embodiments, a different number of integral brackets (and fasteners) may be used, such as 1, 3, 4, etc. The shock assembly 1030 also includes a mounting flange 1130 that mates with a mounting bracket 1132 (see FIG. 11J) that is positioned on the bicycle frame 1000 at the junction between the top tube 1005 and the seat tube 1015. The mounting flange 1130 is secured to the mounting bracket on the bicycle frame 1000 using a fastener 1135 and a cap 1140 for the fastener 1135. In one embodiment, the fastener 1135 can be a bolt and the cap 1140 can be a nut that threads onto the bolt. Alternatively, a different type of fastener system may be used.

FIG. 11C is a partial exploded view depicting a mounting configuration for the chain stays 1025 of the bicycle frame 1000 in accordance with an illustrative embodiment. As depicted, the chain stays 1025 are integrally connected to one another by a bar 1145 that helps to stabilize the bicycle frame 1000. The chain stay assembly 1045 for mounting the chain stays 1025 includes a pivot axle 1150, end spacers 1155, double row bearings 1160, a bearing spacer 1165, and a fastener 1170. In alternative embodiments, the chain stay assembly 1045 may include fewer, additional, and/or different components. In an illustrative embodiment, the fastener 1170 is a threaded insert which is configured to receive the pivot axle 1150. Alternatively, a different type of fastener may be used.

FIG. 11D is an exploded view depicting the sealing assembly 1040 of the seat stay yoke 1035 in accordance with an illustrative embodiment. The sealing assembly 1040 includes linear bushings 1175, a foam ring 1180, and wiper seals 1185. The linear bushings 1175 have low friction inner surfaces that are in contact with the stanchion of the shock assembly 1030. Along with the stanchion, the linear bushings 1175 act as a general linear guide for translation of the shock portion of the shock assembly 1030. The foam ring 1180 is used to wick the lubricant such than an entire exterior perimeter of the stanchion is in contact with the lubricant. The wiper seals 1185 also form a seal around a perimeter of the stanchion and act to scrape/wipe the lubricant from the exterior surface of the stanchion as the stanchion translates longitudinally within the seat stay yoke 1035. As a result, the lubricant is contained and unable to exit through the openings at the ends of the seat stay yoke 1035 and dirt and debris is unable to enter the shock assembly 1030.

Figures 11E, 11F:
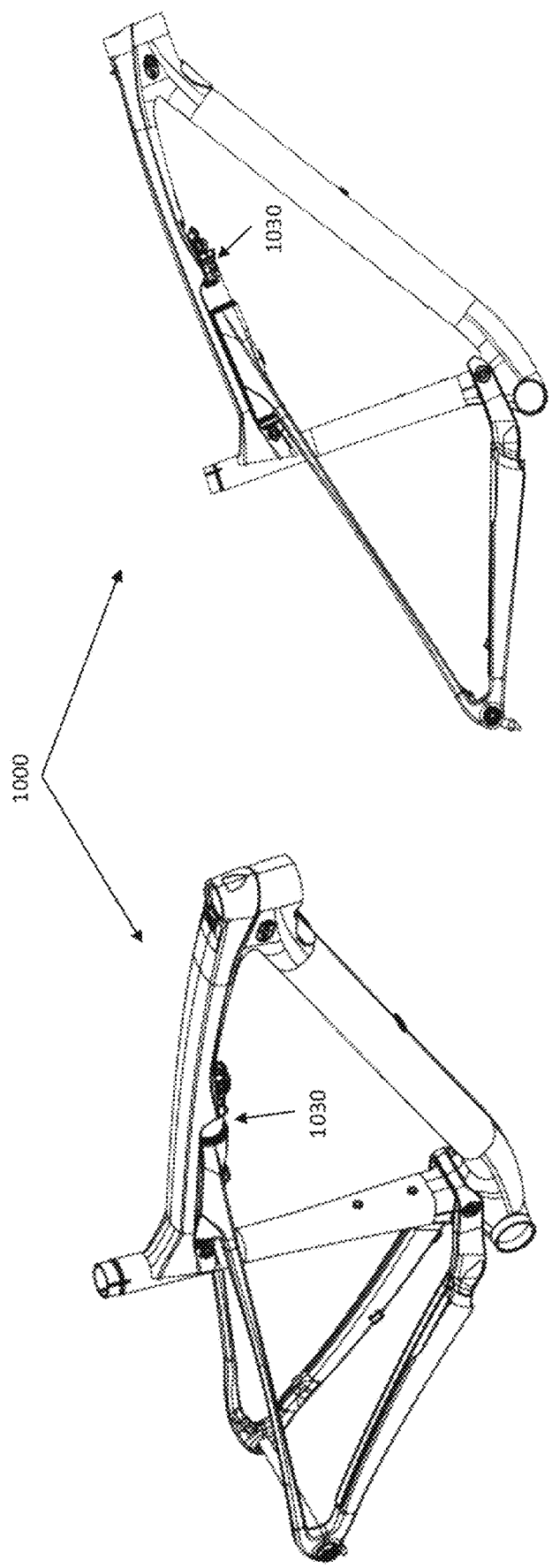
FIG. 11E is a perspective view of the shock assembly mounted to the bicycle frame in accordance with an illustrative embodiment.
FIG. 11F is a side view of the shock assembly mounted to the bicycle frame in accordance with an illustrative embodiment.
Figure 11J:
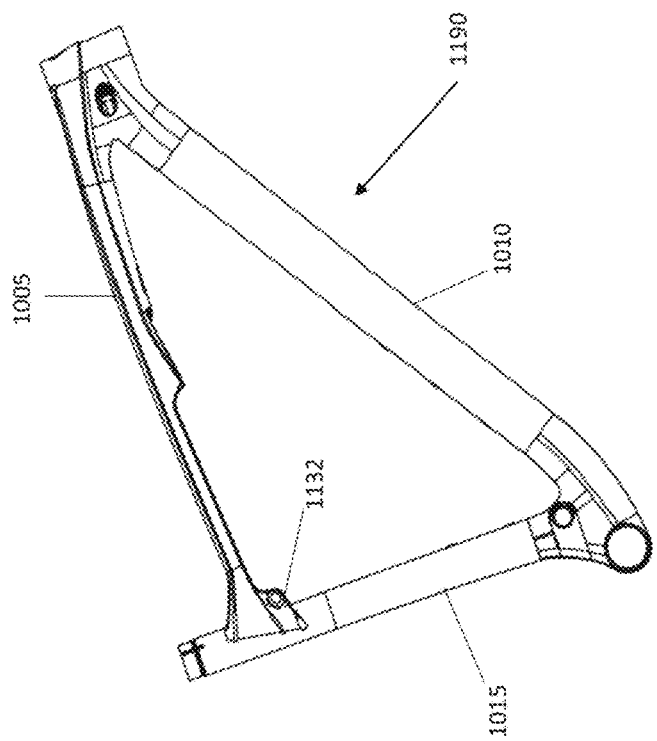
FIG. 11J is a side view of the front triangle of the bicycle frame in accordance with an illustrative embodiment.
Figure 11I:
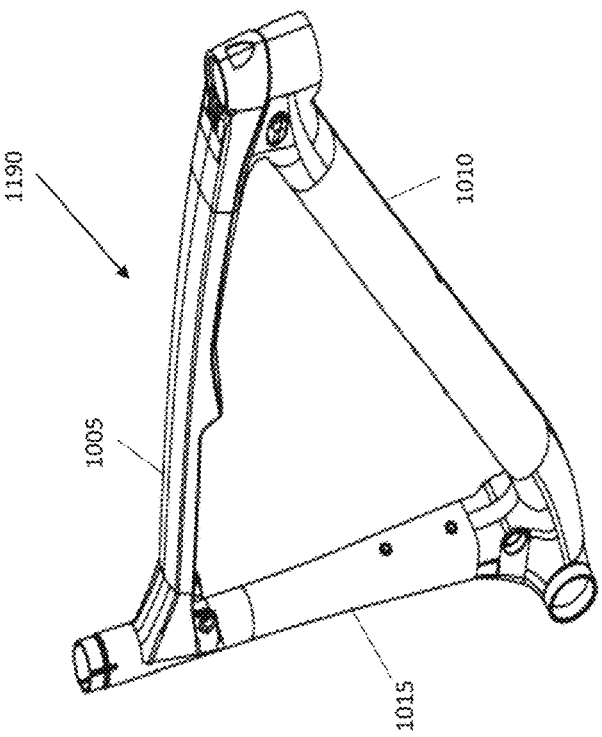
FIG. 11I is a perspective view of a front triangle of the bicycle frame in accordance with an illustrative embodiment.
Figure 11L:
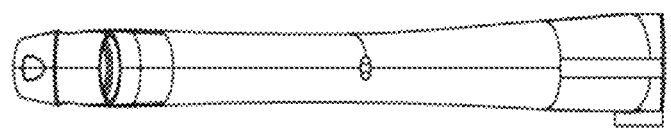
FIG. 11L is a front view of the front triangle in accordance with an illustrative embodiment.
Figure 11K:
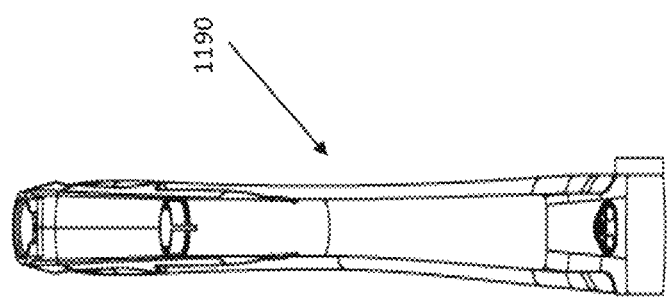
FIG. 11K is a rear view of the front triangle in accordance with an illustrative embodiment.
Figure 11N:
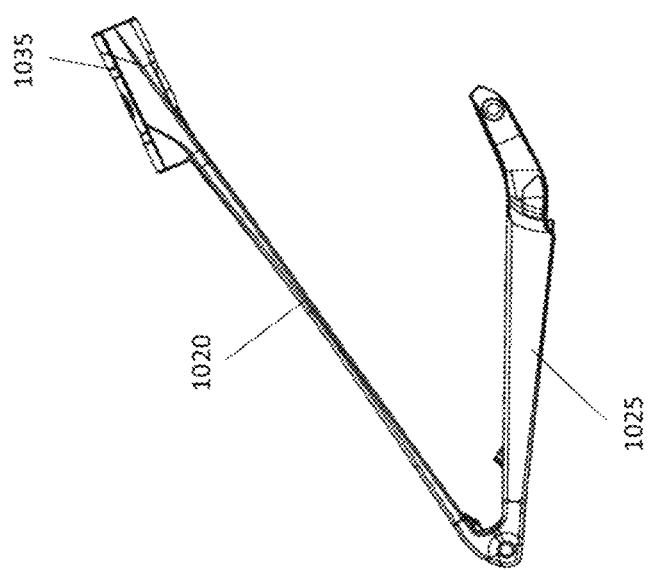
FIG. 11N is a side view of the chain stays and the seat stays in accordance with an illustrative embodiment.
Figure 11M:
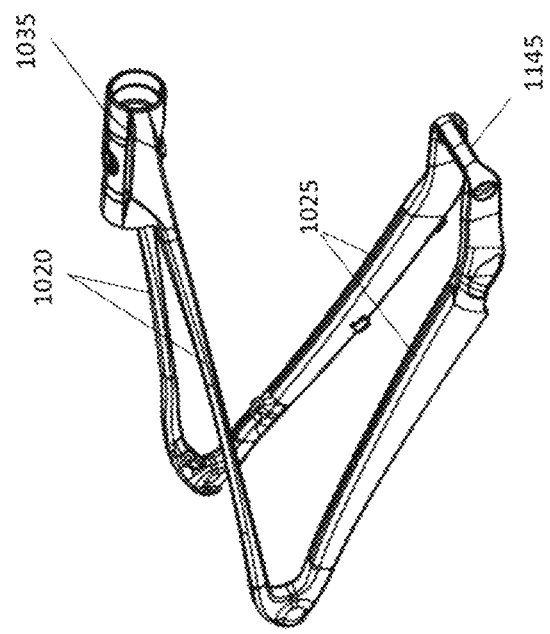
FIG. 11M is a perspective view of the chain stays and the seat stays in accordance with an illustrative embodiment.
Figure 11Q:
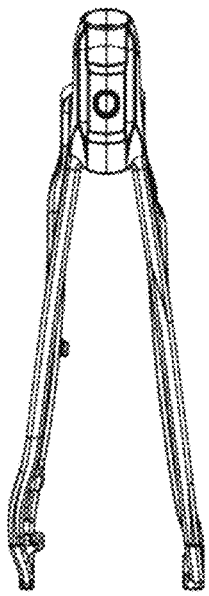
FIG. 11Q is a top view of the chain stays and the seat stays in accordance with an illustrative embodiment.
Figure 11R:
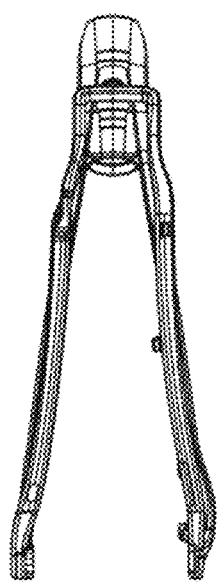
FIG. 11R is a bottom view of the chain stays and the seat stays in accordance with an illustrative embodiment.
Figure 11P:
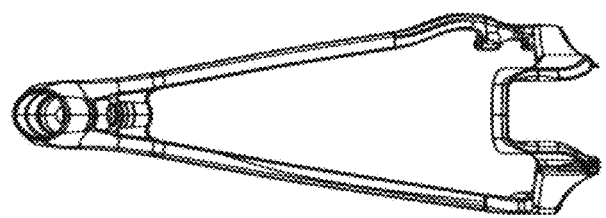
FIG. 11P is a front view of the chain stays and the seat stays in accordance with an illustrative embodiment.
Figure 11O:
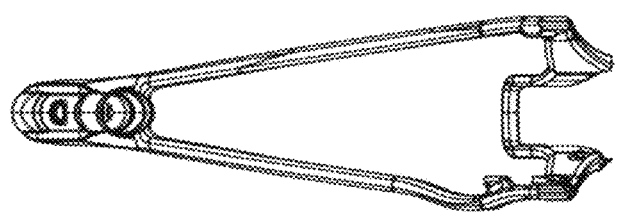
FIG. 11O is a rear view of the chain stays and the seat stays in accordance with an illustrative embodiment.
Figure 11S:
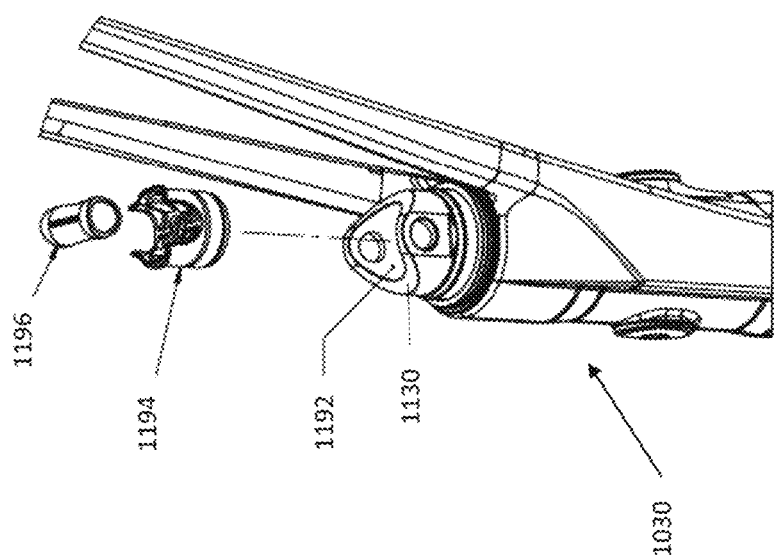
FIG. 11S is a partial exploded view that depicts an oil receptacle and plug for the shock assembly in accordance with an illustrative embodiment.

FIG. 11S is a partial exploded view that depicts an oil receptacle and plug for the shock assembly 1030 in accordance with an illustrative embodiment. The shock assembly 1030 includes an opening 1192 that receives oil to lubricate the shock as it moves. A sleeve 1196 is positioned within the opening 1192 and used to handle clamp-up forces on the mounting flange 1130 on the rear of the stanchion. After oil has been placed into the opening 1192, an oil plug 1194 is installed into the stanchion to prevent the oil from leaking out.

FIGS. 11E-11R depict various views of the assembled bicycle frame 1000 and shock assembly 1030, of the front triangle of the bicycle frame 1000, and of the seat stays 1020 and chain stays 1025 of the bicycle frame 1000. Specifically, FIG. 11E is a perspective view of the shock assembly 1030 mounted to the bicycle frame 1000 in accordance with an illustrative embodiment. FIG. 11F is a side view of the shock assembly 1030 mounted to the bicycle frame 1000 in accordance with an illustrative embodiment. FIG. 11G is a top view of the bicycle frame 1000 in accordance with an illustrative embodiment. FIG. 11H is a bottom view of the bicycle frame 1000 in accordance with an illustrative embodiment.

FIG. 11I is a perspective view of a front triangle 1190 of the bicycle frame 1000 in accordance with an illustrative embodiment. FIG. 11J is a side view of the front triangle 1190 of the bicycle frame 1000 in accordance with an illustrative embodiment. FIG. 11K is a rear view of the front triangle 1190 in accordance with an illustrative embodiment. FIG. 11L is a front view of the front triangle 1190 in accordance with an illustrative embodiment.

FIG. 11M is a perspective view of the chain stays 1025 and the seat stays 1020 in accordance with an illustrative embodiment. FIG. 11N is a side view of the chain stays 1025 and the seat stays 1020 in accordance with an illustrative embodiment. FIG. 11O is a rear view of the chain stays 1025 and the seat stays 1020 in accordance with an illustrative embodiment. FIG. 11P is a front view of the chain stays 1025 and the seat stays 1020 in accordance with an illustrative embodiment. FIG. 11Q is a top view of the chain stays 1025 and the seat stays 1020 in accordance with an illustrative embodiment. FIG. 11R is a bottom view of the chain stays 1025 and the seat stays 1020 in accordance with an illustrative embodiment.

Figure 12B:
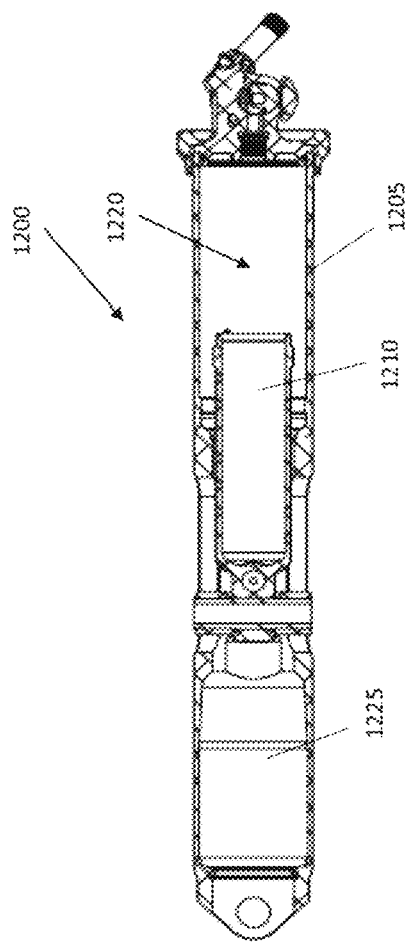
FIG. 12B is a cross-sectional view of the shock assembly of FIG. 12A in accordance with an illustrative embodiment.
Figure 12A:
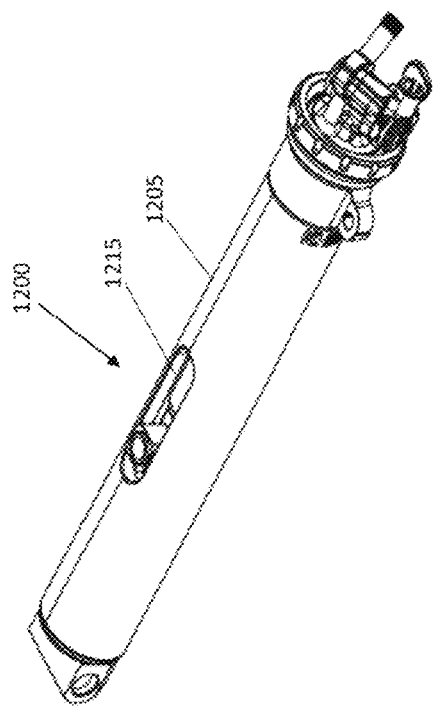
FIG. 12A is a perspective view of a shock assembly in accordance with an illustrative embodiment.

FIGS. 12A-12G depict various views of an alternative shock assembly design in accordance with an illustrative embodiment. FIG. 12A is a perspective view of a shock assembly 1200 in accordance with an illustrative embodiment. FIG. 12B is a cross-sectional view of a shock assembly 1200 in accordance with an illustrative embodiment. As shown, a stanchion 1205 of the shock assembly entirely encases a shock 1210 such that the shock 1210 moves entirely within the stanchion 1205. The stanchion 1205 helps to stabilize the bicycle frame and the shock assembly 1200 mounted thereto. The shock assembly 1200 may also be stiffer than the bicycle frame and used to carry a significant load that would otherwise be imposed directly on the bicycle frame. Similar to other embodiments described herein, the stanchion 1205 includes a slot 1215 that enables and guides movement of the shock 1210. Within the stanchion 1205 is an air spring 1220 (not shown in detail) that facilitates movement of the shock 1210. The stanchion 1205 also includes free space 1225 that accommodates the internal movement of the shock 1210.

Figure 12F:
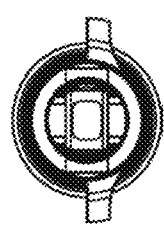
FIG. 12F is a rear view of the shock assembly of FIG. 12A in accordance with an illustrative embodiment.
Figure 12G:
FIG. 12G is a front view of the shock assembly of FIG. 12A in accordance with an illustrative embodiment.
Figure 12C:
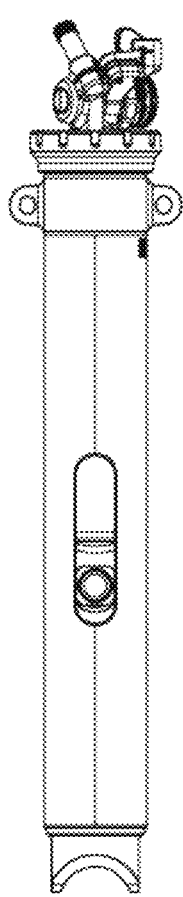
FIG. 12C is a top view of the shock assembly of FIG. 12A in accordance with an illustrative embodiment.
Figure 12D:
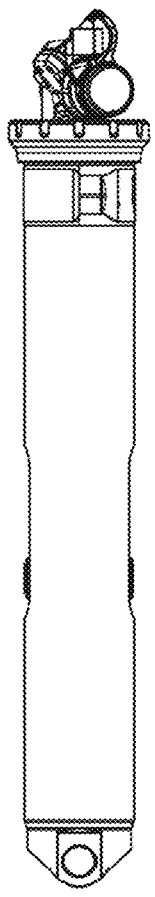
FIG. 12D is a side view of the shock assembly of FIG. 12A in accordance with an illustrative embodiment.
Figure 12E:
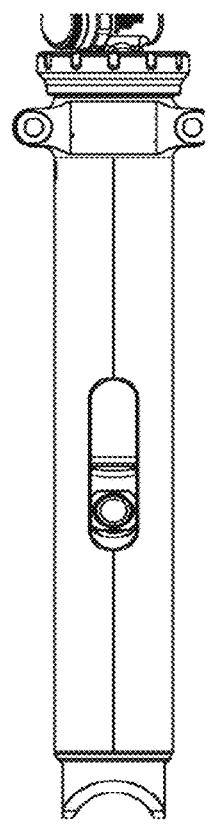
FIG. 12E is a bottom view of the shock assembly of FIG. 12A in accordance with an illustrative embodiment.

FIG. 12C is a top view of the shock assembly 1200 in accordance with an illustrative embodiment. FIG. 12D is a side view of the shock assembly 1200 in accordance with an illustrative embodiment. FIG. 12E is a bottom view of the shock assembly 1200 in accordance with an illustrative embodiment. FIG. 12F is a rear view of the shock assembly 1200 in accordance with an illustrative embodiment. FIG. 12G is a front view of the shock assembly 1200 in accordance with an illustrative embodiment.

Figure 13A:
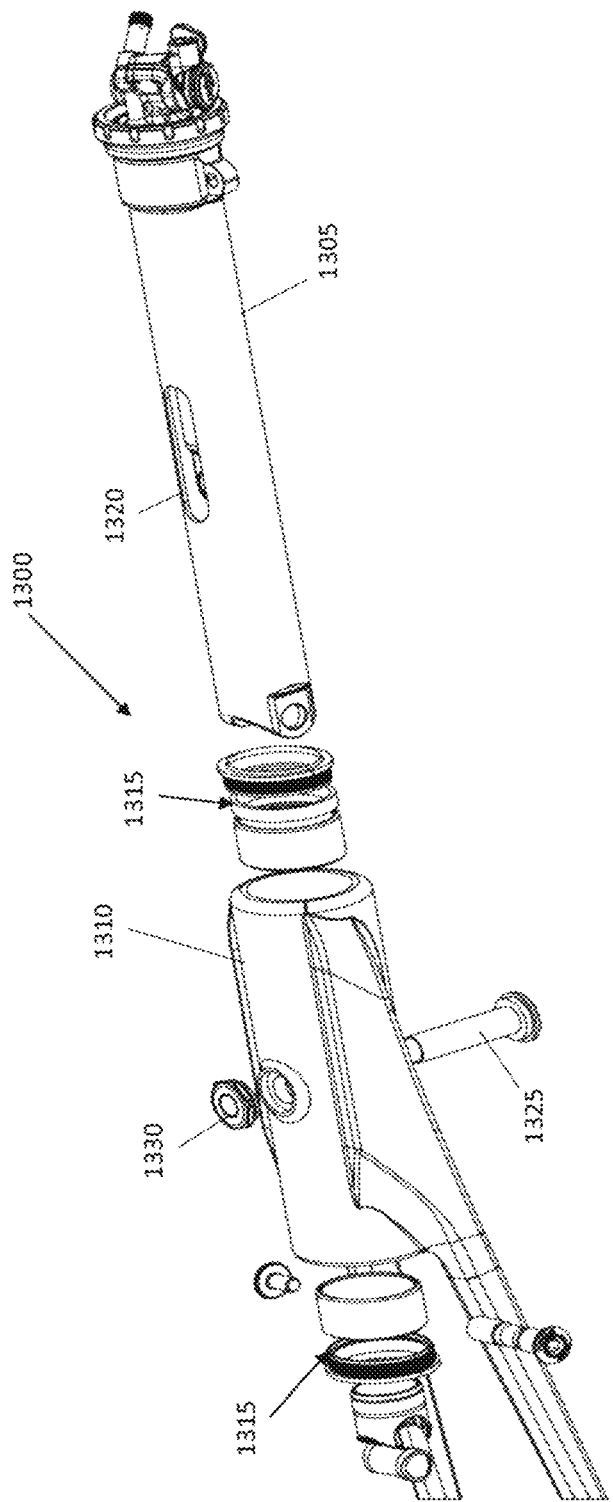
FIG. 13A is an exploded view of a non-round shock assembly in accordance with an illustrative embodiment.

FIGS. 13A-13H depict a non-round shock assembly design in accordance with an illustrative embodiment. Specifically, FIG. 13A is an exploded view of a non-round shock assembly 1300 in accordance with an illustrative embodiment. The non-round shock assembly 1300 includes a non-round stanchion 1305. In an illustrative embodiment, the non-round stanchion 1305 has an oval shape. Alternatively, the non-round stanchion 1305 can have any other non-round shape such oval, square, triangle, star, hexagon, octagon, etc. A seat stay yoke 1310 has a non-round opening that is the same shape as the non-round stanchion 1305 and sized to receive the non-round stanchion 1305. As a result, the non-round stanchion 1305 is unable to rotate within the seat stay yoke 1310, which improves overall stability of the bicycle frame. Seat stay sealing components 1315 (e.g., bearings, foam rings, wiper seals) can also have the same non-round shape as the non-round stanchion 1305 and the opening of the seat stay yoke 1310.

Similar to other designs described herein, the non-round stanchion 1305 includes a slot 1320 that enables translational movement of the shock. A fastener 1325 and cap 1330 are used to secure the non-round stanchion 1305 to the seat stay yoke 1310. However, the embodiment of FIG. 13 may not utilize spacer bushings (such as the spacer bushings 1105 shown in FIG. 11A) because anti-rotation of the non-round shock assembly 1300 is achieved via the mating of the non-round stanchion 1305 with the non-round opening in the seat stay yoke 1310. As a result, a narrower slot 1320 can also be used. In an illustrative embodiment, the shock internal to the non-round stanchion 1305 can have the same non-round shape as the non-round stanchion 1305. Alternatively, the shock may have a different shape relative to the non-round stanchion 1305. For example, the stanchion may be oval in shape and the shock may be round in shape.

Figure 13E:
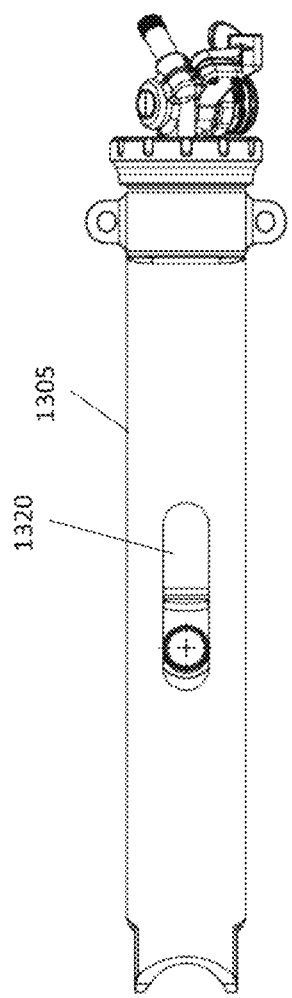
FIG. 13E is a top view of the non-round shock assembly in accordance with an illustrative embodiment.
Figure 13D:
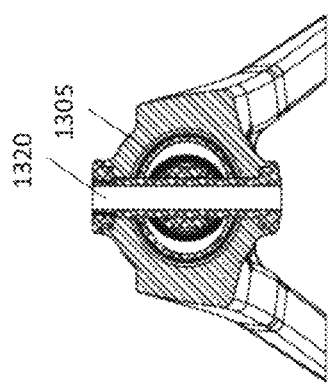
FIG. 13D is a cross-sectional front view of the non-round shock assembly taken along the slot in accordance with an illustrative embodiment.
Figure 13G:
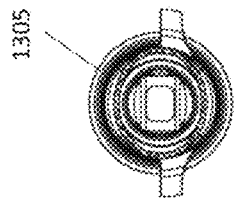
FIG. 13G is a cross-sectional view of the non-round shock assembly taken along the plane A-A of FIG. 13F in accordance with an illustrative embodiment.
Figure 13H:
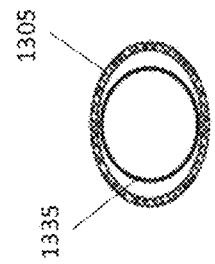
FIG. 13H is a cross-sectional view of the non-round shock assembly taken along the plane B-B of FIG. 13F in accordance with an illustrative embodiment.
Figure 13F:
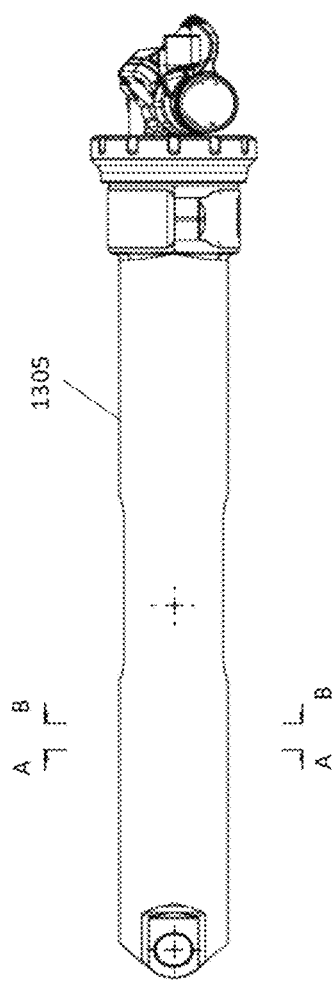
FIG. 13F is a side view of the non-round shock assembly in accordance with an illustrative embodiment.

FIG. 13B is a side view of the non-round shock assembly 1300 in accordance with an illustrative embodiment. FIG. 13C is a cross-sectional top view of the non-round shock assembly 1300 in accordance with an illustrative embodiment. As shown in FIG. 13C, the non-round stanchion 1305 at least partially houses a shock 1335. FIG. 13D is a cross-sectional front view of the non-round shock assembly 1300 taken along the slot 1320 in accordance with an illustrative embodiment. FIG. 13E is a top view of the non-round shock assembly 1300 in accordance with an illustrative embodiment. FIG. 13F is a side view of the non-round shock assembly 1300 in accordance with an illustrative embodiment. FIG. 13G is a cross-sectional view of the non-round shock assembly 1300 taken along the plane A-A of FIG. 13F in accordance with an illustrative embodiment. FIG. 13H is a cross-sectional view of the non-round shock assembly 1300 taken along the plane B-B of FIG. 13F in accordance with an illustrative embodiment.

In another illustrative embodiment, any of the shock assemblies described herein can be mounted at a plurality of different angles on the bicycle frame, depending on overall frame size and desired rear spring rate for the frame. FIG. 14 depicts a shock assembly angle 1400 of a shock assembly 1420 in accordance with an illustrative embodiment. The shock assembly angle 1400 refers to an angle between a first line 1405 that is parallel to a flat ground plane 1410 upon which the bicycle rests and that passes through a center of a hole in the front mounting flange 1415 of the shock assembly 1420 (i.e. the location at which the shock assembly 1420 mounts to the top tube of the bicycle), and a second line 1425 that passes through the center of the hole in the front mounting flange 1415 and that extends longitudinally through the stanchion 1430 (i.e., in between and parallel to sidewalls of the stanchion 1430) of the shock assembly 1420.

FIG. 15 depicts a bicycle 10 in accordance with an illustrative embodiment. Any of the frame components and/or shock assemblies described herein can be incorporated into the bicycle 10 using any techniques known in the art. The bicycle 10 includes a frame 13 to which a seat assembly 12 and handlebars 16 are attached. A seat clamp 14 is engaged with an underside 15 of the seat assembly 12 and cooperates with a seat post 20 that slidably engages a seat tube 22 of the frame 13. A top tube 24 and a down tube 26 extend forwardly from the seat tube 22 to a head tube 28 of the frame 13.

Handlebars 16 are connected to a steerer tube 30 that passes through the head tube 28 and engages a fork crown 32. A pair of forks 34, 35 extend from generally opposite ends of the fork crown 32 and are constructed to support a front wheel assembly 36 at an end thereof or fork tip 38. The fork tips 38 engage generally opposite sides of an axle 40 that is constructed to engage a hub 42 of the front wheel assembly 36. A number of spokes 44 extend from the hub 42 to a rim 46 of the front wheel assembly 36. A tire 48 is engaged with the rim 46 such that rotation of the tire 48, relative to the forks 34, rotates the rim 46 and the hub 42.

A rear wheel assembly 56 is positioned generally concentrically about a rear axle 64. A seat stay 65 and a chain stay 66 offset the rear axle 64 from a crankset 68. The crankset 68 includes pedals 70 that are operationally connected to a flexible drive such as a chain 72 via a chain ring or sprocket 74. Rotation of the chain 72 communicates a drive force to a rear section 76 of the bicycle 10 having a gear cluster 78 positioned thereat. The gear cluster 78 is generally concentrically orientated with respect to the rear axle 64 and includes a number of variable diameter gears. The gear cluster 78 is operationally connected to a hub 80 associated with a rear tire 69 of rear wheel assembly 56. A number of spokes 82 extend radially between the hub 80 and a rim 81 that supports tire 69 of rear wheel assembly 56. As is commonly understood, rider operation of the pedals 70 drives the chain 72 thereby driving the rear tire 69 which in turn propels the bicycle 10.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A bicycle frame comprising:
a front triangle that includes a top tube, a down tube, and a seat tube, wherein a bottom side of the top tube includes a cavity;
a seat stay assembly that includes a first seat stay, a second seat stay, and a seat stay yoke that connects the first seat stay and the second seat stay, wherein the seat stay yoke is configured to at least partially fit within the cavity on the bottom side of the top tube;
an inline shock assembly that includes a stanchion and a shock, wherein at least a portion of the stanchion is configured to fit within the seat stay yoke; and
a first seal assembly mounted to a first end of the seat stay yoke and configured to form a seal between the seat stay yoke and the stanchion.

2. The bicycle frame of claim 1, further comprising a first mounting bracket on the top tube, wherein the shock of the inline shock assembly is configured to be secured to the first mounting bracket.

3. The bicycle frame of claim 2, further comprising a second mounting bracket on the seat tube, wherein the stanchion of the inline shock assembly is configured to be secured to the second mounting bracket.

4. The bicycle frame of claim 3, further comprising a stanchion mount which is configured to secure the stanchion, wherein the stanchion mount is mounted to the first mounting bracket.

5. The bicycle frame of claim 1, wherein the stanchion has a non-round cross section.

6. The bicycle frame of claim 1, wherein the stanchion includes a pair of slots configured to receive a mounting sleeve, a first spacer bushing mounted to the mounting sleeve, and a second spacer bushing mounted to the mounting sleeve.

7. The bicycle frame of claim 6, wherein the mounting sleeve is configured to pass through a mounting hole of the shock.

8. The bicycle frame of claim 7, further comprising a fastener configured to pass through an upper hole of the seat stay yoke, through the mounting sleeve, and through a lower hole of the seat stay yoke to secure the inline shock assembly to the seat stay yoke.

9. The bicycle frame of claim 6, wherein the pair of slots include a smooth surface to facilitate low friction longitudinal translation of the first spacer bushing and the second spacer bushing within the pair of slots.

10. The bicycle frame of claim 1, wherein the first seal assembly includes a first bushing, a first foam ring, and a first wiper seal.

11. The bicycle frame of claim 10, further comprising a second seal assembly mounted to a second end of the seat stay yoke, wherein the second seal assembly includes a second bushing, a second foam ring, and a second wiper seal.

12. The bicycle frame of claim 11, wherein the first seal assembly and the second seal assembly are configured to contain a lubricant within at least a portion of the seat stay yoke.

13. The bicycle frame of claim 1, wherein the seat stay assembly further includes a first chain stay and a second chain stay, and wherein each of the first chain stay and the second chain stay includes a contoured through hole.

14. The bicycle frame of claim 13, wherein the contoured through hole has an octagonal contour.

15. The bicycle frame of claim 13, further comprising a contoured pivot axle configured to mount through the contoured through holes of the first chain stay and the second chain stay to secure the first chain stay and the second chain stay to the seat tube.

16. A method of constructing a bicycle frame, comprising:
    forming a front triangle that includes a top tube, a down tube, and a seat tube, wherein forming the front triangle includes forming a cavity on a bottom side of the top tube;
    forming a seat stay assembly that includes a first seat stay, a second seat stay, and a seat stay yoke that connects the first seat stay and the second seat stay, wherein the seat stay yoke is formed to at least partially fit within the cavity on the bottom side of the top tube;
    mounting an inline shock assembly that includes a stanchion and a shock to the seat stay yoke and to the top tube; and
    mounting a seal assembly to a first end of the seat stay yoke to form a seal between the seat stay yoke and the stanchion.

17. The method of claim 16, wherein mounting the inline shock assembly further comprises mounting the stanchion of the inline shock assembly to a mounting bracket formed on the seat tube.

18. The method of claim 16, wherein mounting the inline shock assembly to the seat stay yoke comprises:
    placing a mounting sleeve through an upper slot in the stanchion, through a mounting hole in the shock, and through a lower slot in the stanchion;
    placing a first spacer bushing above the mounting hole in the shock such that the first spacer bushing rests within the upper slot in the stanchion;
    placing a second spacer bushing below the mounting hole in the shock such that the second spacer bushing rests within the lower slot in the stanchion; and
    placing a fastener through an upper hole in the seat stay yoke, through the mounting sleeve, and through a lower hole in the seat stay yoke.

19. The method of claim 16, further comprising forming a first relief cut in the first seat stay and a second relief cut in the second seat stay to increase flexibility of the seat stay assembly.

20. The method of claim 16, wherein the seal assembly includes a bushing, a foam ring, and a wiper seal.

* * * * *